United States Patent [19]

Toide et al.

[11] Patent Number: 5,066,138
[45] Date of Patent: Nov. 19, 1991

[54] OPTICAL HEAD APPARATUS

[75] Inventors: Eiichi Toide; Shinsuke Shikama; Masayuki Kubota, all of Nagaokakyo, Japan

[73] Assignee: Mitsubishi Denki Kabushiki Kaisha, Tokyo, Japan

[21] Appl. No.: 337,136

[22] Filed: Apr. 12, 1989

[30] Foreign Application Priority Data

Jun. 16, 1988 [JP] Japan ................................ 63-177701
Jul. 11, 1988 [JP] Japan ................................ 63-170824

[51] Int. Cl.$^5$ ........................ G11B 7/00; G11B 11/18
[52] U.S. Cl. ................................ 369/112; 369/44.41; 369/120; 369/44.14; 369/44.12; 359/15
[58] Field of Search ............... 369/44.12, 44.37, 44.38, 369/44.41, 44.42, 112, 111, 120; 350/3.72, 3.71, 3.73; 250/201.5

[56] References Cited

U.S. PATENT DOCUMENTS

| | | | |
|---|---|---|---|
| 4,829,506 | 5/1989 | Bressers et al. | 369/112 |
| 4,885,734 | 12/1989 | Yuzo | 369/120 |
| 4,904,856 | 2/1990 | Nagahama et al. | 250/201.5 |
| 4,945,529 | 7/1990 | Ono et al. | 369/120 |

OTHER PUBLICATIONS

Japanese Patent Application Laid-Open No. 56-57013, Date: 5/19/81.

Japanese Patent Application Laid-Open No. 62-217425, Date: 9/24/87.

Primary Examiner—Roy N. Envall, Jr.
Assistant Examiner—Nabil Hindi
Attorney, Agent, or Firm—Wolf, Greenfield & Sacks

[57] ABSTRACT

An optical head apparatus is provided with a holographic element composed of the first grid region which splits the light beam emitted from the light source into a plurality of light beams and the second grid region which diffracts the light beams reflected from the data-recording medium on the same plane, and prevents unnecessary signals from mixing themselves into the reproduction signal by varying at least the diffraction direction or the diffraction angle of the light beams in these grid regions.

The first grid region has an elliptic aperture to make the ±/primarily condensed spot beams onto the data-recording medium being extended elliptically to the data-recording direction.

The direction of the border of the four photosensitive elements of the photo detector which detects the light beams reflected from the data-recording medium coincides with the direction of the deviation of the condensed spot beams of the reflected light beam, the deviation being caused by the deviation of tracking, the variation of the wave length of the light source and the like.

7 Claims, 24 Drawing Sheets

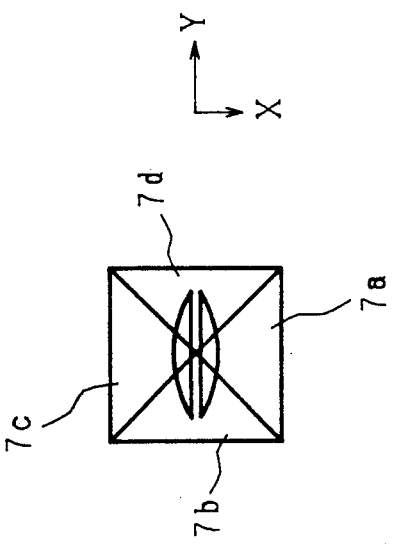
Fig. 17(a)  Fig. 17(b)  Fig. 17(c)
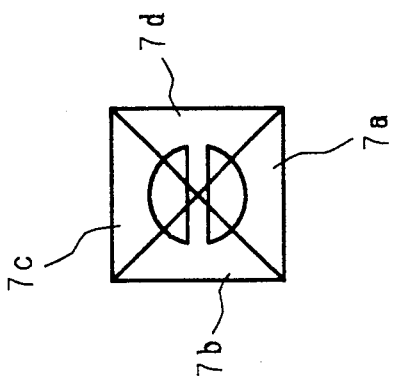
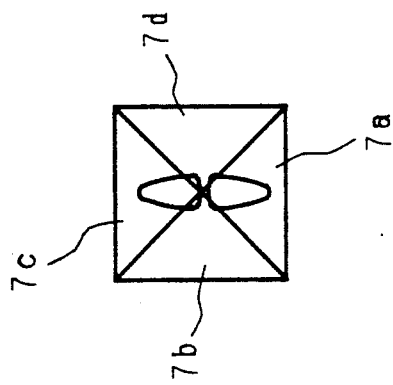
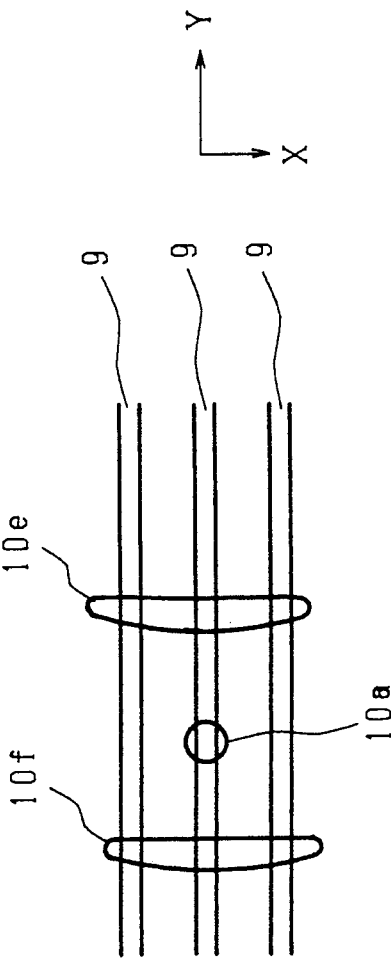
Fig. 18

OPTICAL HEAD APPARATUS

BACKGROUND OF THE INVENTION

1. Field of the Invention

The present invention relates to an optical head apparatus for use with a data processor which optically records, reproduces and erases data. More particularly, the invention relates to an optical head apparatus using a holographic element.

2. Description of the Prior Art

Like the one shown in Japanese Patent Application Laid-Open No. 56-57013 (1981), an optical head apparatus mounting with a holographic beam splitter is well known. Referring now to FIGS. 1 through 4, a conventional optical head apparatus is described below. The reference numeral 1 represents the semiconductor laser which constitutes the light source, 2 represents the light beam emitted from the semiconductor laser 1, and 8 represents the diffraction grid which is substantially a three-light-beam generating means splitting the emitted light beam 2 into three light beam each having the different condensing position. The reference numeral 3 represents the condensing lens which constitutes a means for condensing the emitted light beam 2 onto an optical disc 4 which constitutes the data memory medium. The optical disc 4 has tracks 9 for storing data on the concentricity thereof. The reference numeral 5 represents a holographic beam splitter which constitutes beam splitting means. In order to give astigmatism to a reflected light beam 6a which is the primarily diffracted light, the holographic beam splitter 5 has the stripe configuration which causes the grid cycle to gradually vary in the aperture. The holographic beam splitter 5 splits the reflective light beam 6 diffused and reflected from the optical disc 4 from the emitted light beam 2 and then converts it into the reflected light beam 6a containing the astigmatism. The reference numeral 7 represents the photodetector which receives the reflected light beam 6a. As shown in FIG. 2, the interior of the photodetector 7 is divided into four parts consisting of photoelements 7a through 7d, where the photodetector 7 is composed of a main detecting unit 7t detecting a main reflected light beam 6t, photoelements 7e and 7f provided on both sides of the main detecting unit 7t, and the arithmetic operating units 18 and 19 executing a variety of arithmetic operations based on the signals output from the photoelements 7a through 7f.

Next, functional operation of the above-cited optical head apparatus in connection with the reproduction, tracking servo, and the focus servo, is described below. The light beam 2 emitted from the semiconductor laser 1 is split into three emitted light beams 2 by the diffraction grid 8. Next, these three light beams 2 permeate the holographic beam splitter 5. Only the zero-dimensional diffracted light is radiated by a condensing lens 3 against the tracks 9 on the optical disc 4 in the state of substantially non-astigmation three condensed spot beams 10a, 10e and 10f. The reflected light beam 6 diffused and reflected from the optical disc 4 is then led into the holographic beam splitter 5 through the condensing lens 3 again, then varying its traveling direction. The traveling direction of the reflected light beam 6 from the optical disc 4 is initially diffracted by the holographic beam splitter 5 by angle $\theta$, and then, the reflected light beam 6a is received by the photodetector 7 which is disposed being apart from the semiconductor laser 1 by a space $\delta$. The reflected light beam 6a is composed of three reflected light beams 6t, 6e and 6f when entering into the photodetector 7, 6t is received by the photoelement 7t, 6e by the photoelement 7e, and 6f by the photoelement 7f, respectively. The photoelements 7a through 7d of the main photodetecting unit 7t, detect the reflected light beam 6t respectively and then output signals. Based on these output signals, arithmetic operating units 18a through 18c, calculate "7a+7b+7c+7d" respectively, as a result, a reproduction signal 17 is generated to read the data of tracks 9.

Normally, due to occurrence of error in the installation process, the rotation axis of a driving gear of the optical-disc drive unit and the axis of the optical disc 4 do not precisely match each other. As a result, the track deviates in agreement with the rotation. The "twin-spot" method disclosed by the preceding Japanese Patent Publication No. 53-13123 (1978) for example is well known for detecting the deviated track. The method of detecting the deviated track by applying the "twin-spot" method is described below. FIG. 3 represents the ideal position relationship between the track 9 and the condensed spot beam 10 on the optical disc 4. Since the data-reading is executed by the condensed spot beam 10a, it is necessary for the system to correctly radiate the condensed spot beam 10a onto the track 9. To achieve this, the condensed spot beams 10e and 10f are condensed at the symmetrical positions centering the condensed spot beam 10a across the track 9. The condensed spot beams 10e and 10f diffuse and reflect before becoming the reflected light beams 6e and 6f respectively, which are then received by the photoelements 7e and 7f via the condensing lens 3 and the holographic beam splitter 5. The arithmetic operating element 19a calculates the signals output from the photoelements 7e and 7f, i.e., the difference of the reflection intensity between the condensed spot beams 10e and 10f before generating the differential output, and finally, a tracking error signal 11 proportional to the deviation of the track is generated. By feeding the tracking error signal 11 to a tracking actuator (not shown) which moves the condensing lens 3 in the direction perpendicular to the track 9, the optical head apparatus can constantly condense the condensed spot beams 10a at the center of the track 9.

The surface of the optical disc 4 normally is not flat, and the surface oscillates itself while the disc rotates, thus generating the focus deviation. To detect the deviated focus, as well known in Japanese Patent Publication No. 53-39123 (1978) for example, it has been proposed to give the astigmatism to the reflected light beam 6 from the optical disc 4 so as to detect the deviated focus by variation of the configuration of the light beam 6. The method of detecting the deviated focus is described below. First, the holographic beam splitter 5 gives the astigmatism to the reflected light beam 6. According to the direction of the far-and-near deviation of the focus position of the condensing lens 3 from the optical disc 4, the spot-beam configuration of the reflected light beam 6t in the detection region of the main photodetecting unit 7t of the photodetector 7 varies from the circle to the ellipse which extends in the direction 90° away. When the optical disc 4 approaches the focal position, the spot-beam configuration varies from the original state shown in FIG. 4-b to the elliptic shape shown in FIG. 4-a. The spot-beam configuration also varies into the elliptic shape shown in FIG. 4-c when the optical disc 4 leaves the focal position. Photoelements 7a through 7d detect the variation of the reflected light beam 6t respectively. These photoelements 7a through 7d output signals corresponding to the volume of the received light respectively. The arithmetic operating elements 18a, 18b and 19b execute the calculation of the expression $(7a+7c)-(7b+7d)$ to generate the comparative output, i.e., the focusing error signal 12. The deviated focus of the condensed spot beam 10 on the optical disc 4 can be corrected by operating the focusing actuator (not shown) after feeding the focusing error signal 12 to the actuator which moves the condensing lens 3 in the direction of the light axis.

The conventional optical head apparatus has such structure as described above, and thus, in order to employ the "twin-spot" method, it is necessary to largely vary the traveling direction of the reflected light beam 6a by disposing the diffraction grid 8 between the semiconductor laser 1 and the holographic beam splitter 5 so that the reflected light beam 6a cannot be shut off by the diffraction grid 8. In order to maintain the diffraction angle $\theta$, assume that the grid cycle of the holographic beam splitter 5 is P and the wave length of the semiconductor laser 1 is $\lambda$, the grid cycle given by the expression P $\lambda/\theta$ is required. For example, if $\theta=0.7$ rad (about 40°) and $\lambda=0.78$ micron, then P=1.1 microns or, the extremely small grid cycle is generated. This makes it quite difficult for manufacturers to produce the holographic beam splitter 5. A longer distance $\delta$ is required between the semiconductor laser 1 and the photo-detector 7, as a result, there is a disadvantage that the dimension of the optical head apparatus expands.

Those disadvantages mentioned above are produced because the reflected light beam 6a must arrive at the photodetector 7 without coming into contact with the diffraction grid 8. Thus, as shown in FIG. 5, it is proposed to provide such an optical head apparatus which allows the reflected light beam 6a to arrive at the photodetector 7 after the reflected light beam 6a again permeates the diffraction grid 8. Since the diffraction angle $\theta$ of the holographic beam splitter 5 can be diminished, manufacturers can easily produce the above optical head apparatus. Furthermore, a more compact apparatus can be obtained because of the shorter distance $\delta$. However, the permeation of the reflected light beam 6a through the diffraction grid 8 leads to the following problems.

The diffraction grid 8 splits the light beam 2 emitted from the semiconductor laser 1 into three light beams, which are diffused and reflected from the optical disc 4. The reflected light beam 6a (being composed of 6t, 6e and 6f), diffracted by the holographic beam splitter 5, again permeates the beam-splitting diffraction grid 8. Concurrently, these reflected light beams 6t, 6e and 6f are split into three light beams respectively. As a result, the photo-detector 7 detects a total of nine light beams. These light beams are represented by 6t$\alpha$, 6e$\alpha$ and 6f$\alpha$ ($\alpha$: diffraction dimensional number $_{-1}$, $_0$ and $_{+1}$) respectively. The state of the reflected light beam 6a radiating the photodetector 7 is shown in FIG. 6. In addition to the originally reflected light beam 6t, the main photodetector 7t also receives two unnecessary reflected light beams $6e_{+1}$ and $6f_{-1}$. These two reflected light beams $6e_{+1}$ and $6f_{-1}$ have already read the data from the track 9 on the optical disc 4 being different from the track 9 which have received the radiation of the condensed spot beam 10a, and as a result, those unnecessary reflected light beams make up noise component in the original signal, thus degrading the performance characteristic of the reproduced signal 17.

The tracking signal 11 is generated by the differential signal output from the photoelements 7e and 7f. When the optical disc 4 inclines itself by the surface oscillation and the like, the balance between these photoelements 7e and 7f is lost, thus causing the tracking error signal 11 to be offset. The reflected light beams $6e_0$ and $6t_{-1}$ superimpose themselves in the photoelement 7e. However, since the length of the light path until each light beam from the semiconductor laser 1 reaches the photoelement 7e after the reflection from the optical disc 4 is almost equal to each other, interference occurs on the photoelement 7e, as a result, the output signal does not make up the sum of the intensity of the two reflected light beams $6e_0$ and $6t_{-1}$.

When the optical disc 4 inclines itself, the difference of the length of the light path slightly varies to alter the state of the interference, thus, the output detection signal varies. Consequently, the tracking error signal 11 unstably varies itself.

SUMMARY OF THE INVENTION

The invention has been achieved for fully solving those problems mentioned above.

The primary object of the invention is to provide a novel optical head apparatus having simple and compact structure, which is capable of preventing the reproduced signals from degrading and becoming unstable.

Another object of the invention is to provide a novel optical head apparatus which is capable of generating satisfactory tracking error signal and which has high performance in the tracking control.

Further object of the invention is to provide a novel optical head apparatus which is capable of preventing the focus error signal from incurring offset, and yet, capable of stably performing the focus control.

The above and further objects and features of the invention will more fully be apparent from the following detailed description with accompanying drawings.

BRIEF DESCRIPTION OF THE DRAWINGS

FIGS. 17 (a) through (c) are the conceptive charts showing the condensed condition of the reflected light beam, which explain the astigmatism respectively;

FIGS. 18 and 21 are the schematic charts showing the status of the condensed spot beams on the recording medium respectively;

DESCRIPTION OF THE PREFERRED EMBODIMENTS

Figure 1:
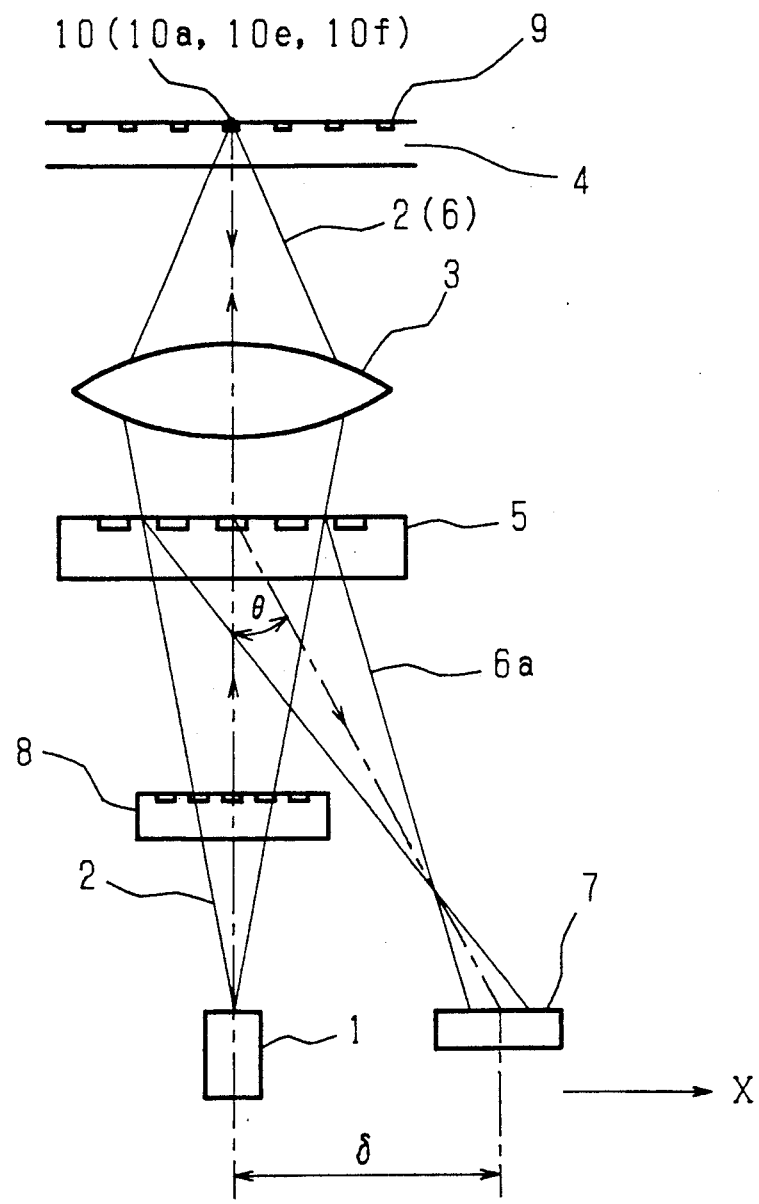
FIG. 1 is a block diagram of the light path of a conventional optical head apparatus.
Figure 2:
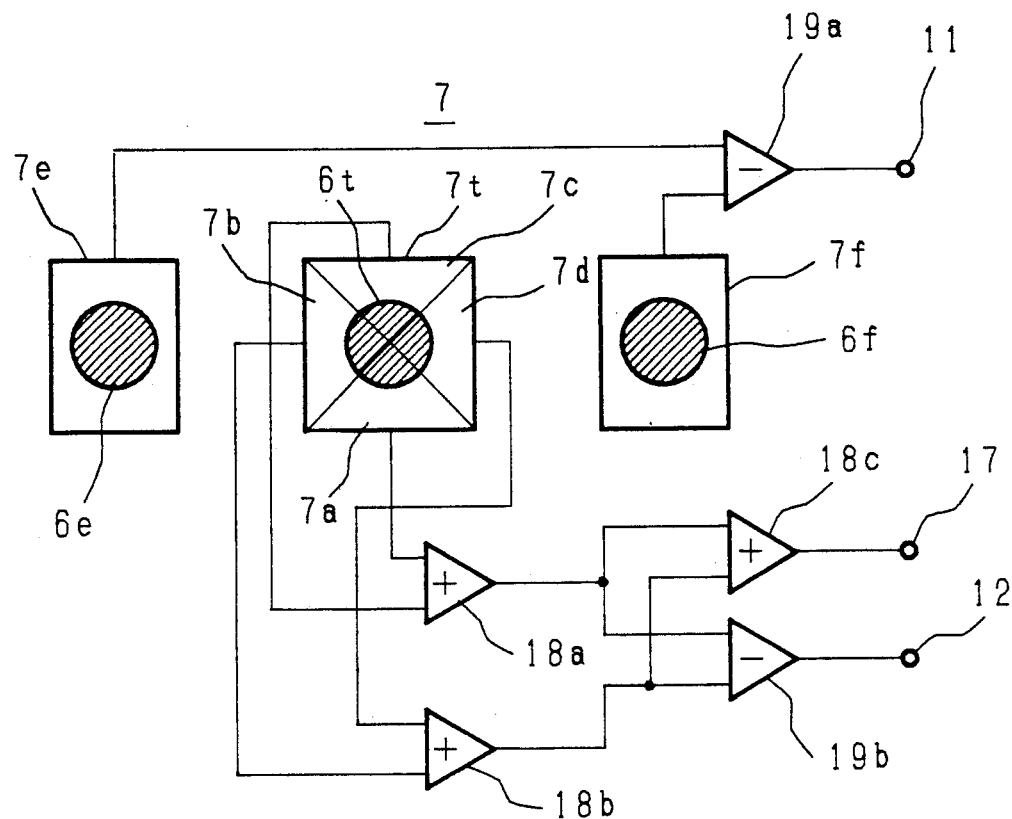
FIG. 2 is a block diagram of the photodetector of the conventional optical head apparatus.
Figure 3:
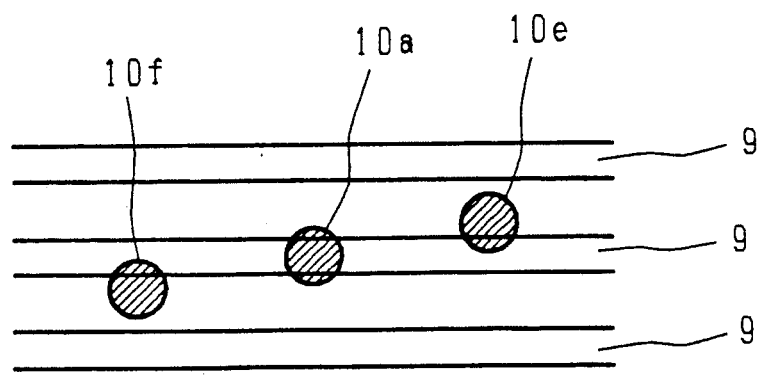
FIG. 3 is a schematic chart showing the status of the condensed spot beam on the recording medium.
Figure 4A:
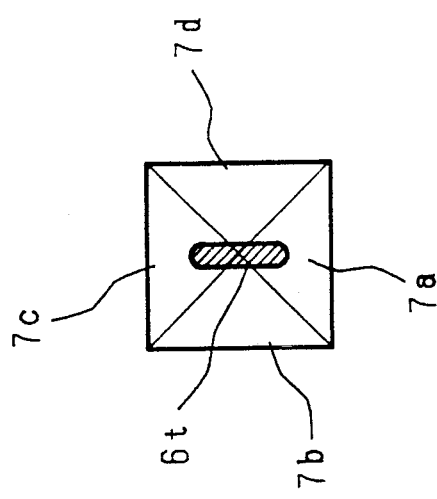
FIGS. 4(a)–4(c) are schematic charts showing the condensed condition of the reflected light beam in the photodetector.
Figure 4B:
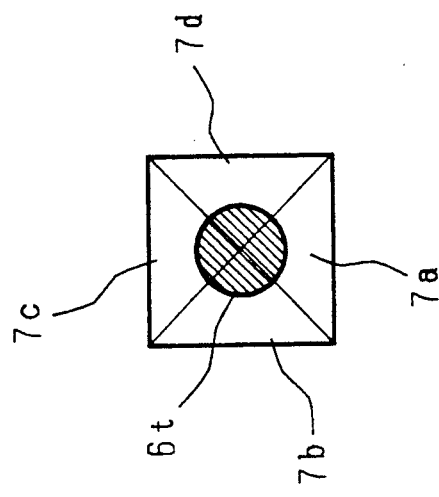
Figure 4C:
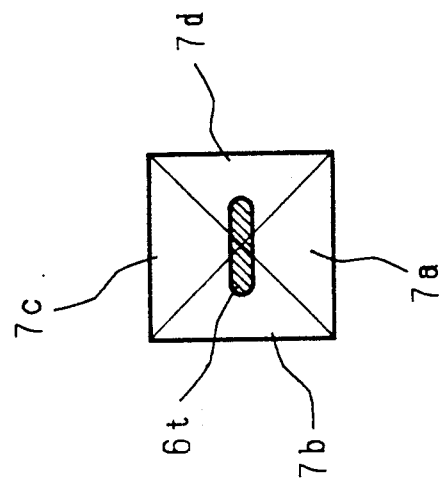
Figure 5:
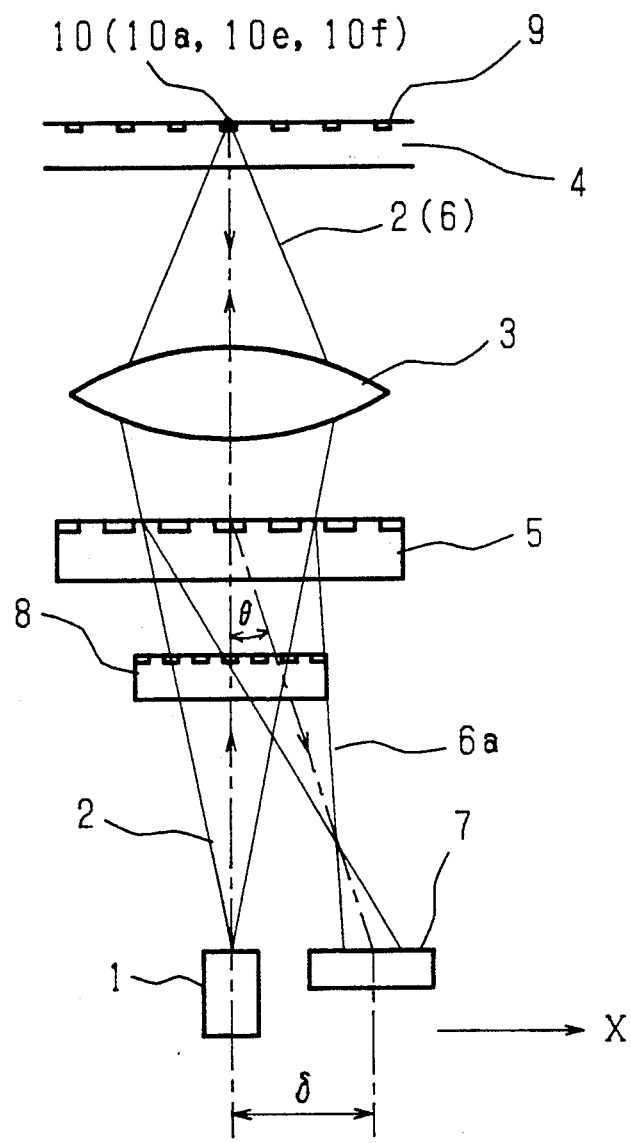
FIG. 5 is a schematic diagram of the entire structure of the conventional optical head apparatus.
Figure 6:
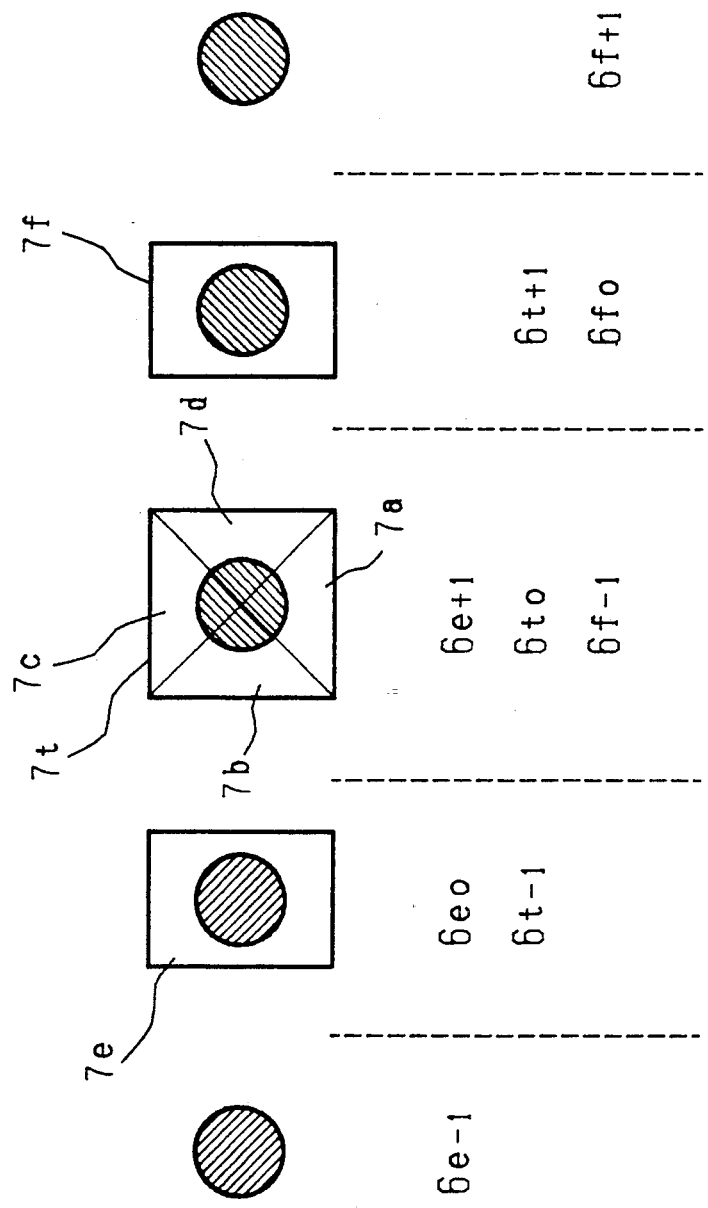
FIG. 6 is a schematic chart showing the condensed condition of the reflected light beam of the conventional optical head apparatus.
Figure 7:
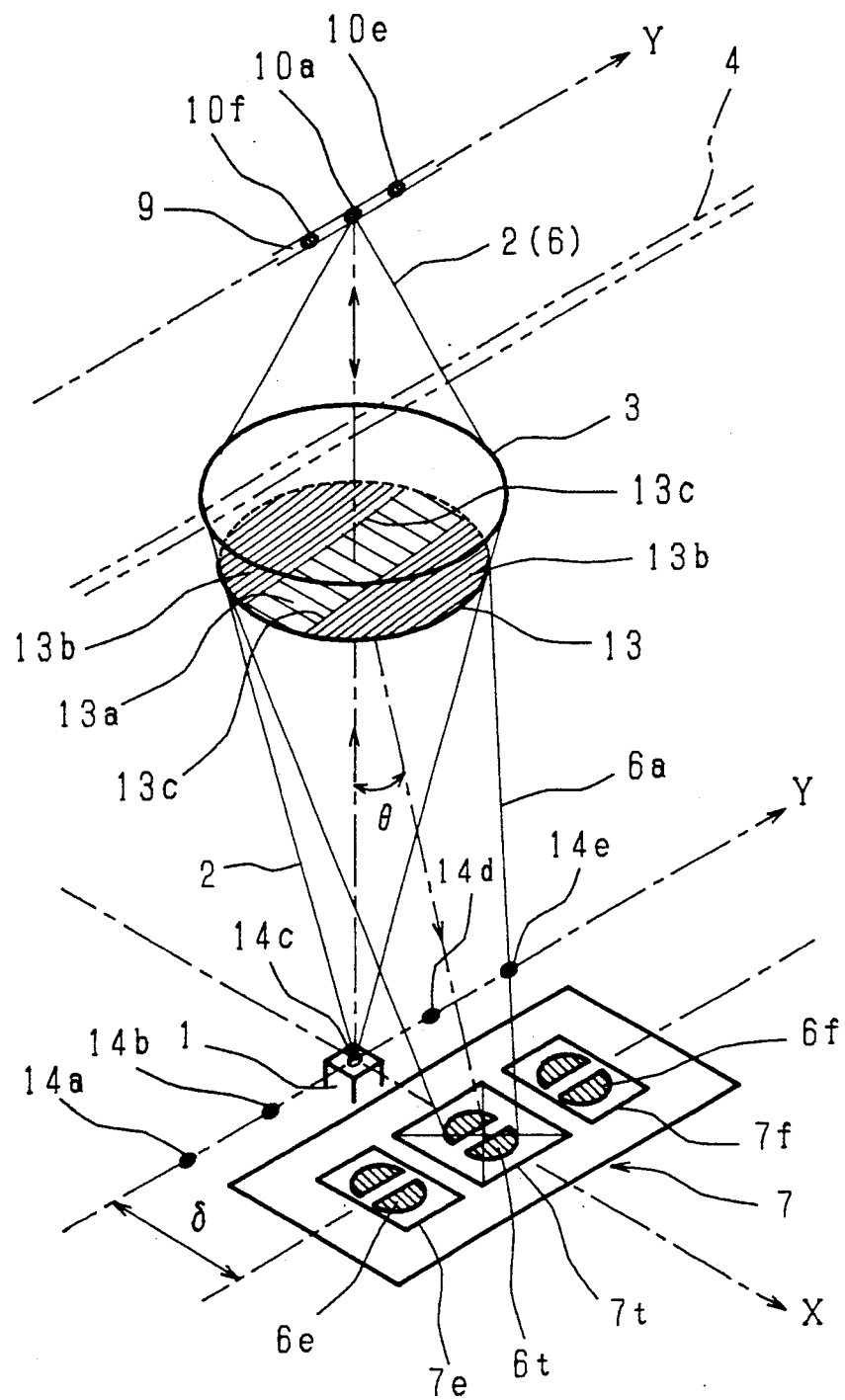
FIGS. 7, 11, 12, 13, 20, 23, 25 and 28 show the light paths of the optical head apparatus related to the invention respectively.
Figure 8:
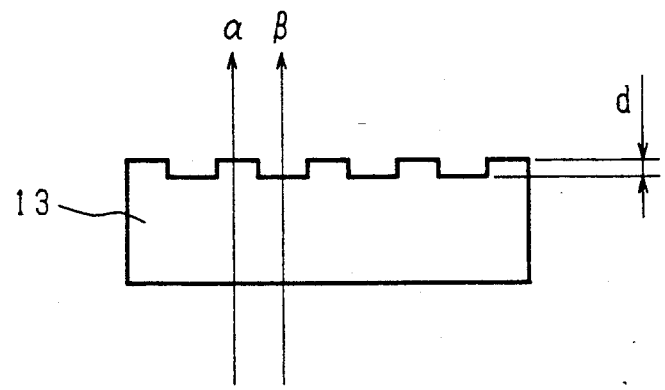
FIG. 8 is a partially sectioned diagram of a holographic element.

Referring now to the accompanying drawings FIG. 7 through FIG. 10, a preferred embodiment of the optical head apparatus related to the invention is described below. By way of expressing the identical reference numerals, the description of those elements identical to those which are shown in FIGS. 1 through 4 is deleted. The holographic element 13 shown in the drawings is provided with the grid region 13a having the function of the diffraction grid which is means for generating three light beams and the other grid regions 13b/13b each having the function of the holographic beam splitter which is means for splitting beams, where the grids 13a and 13b/13b are disposed on the identical plane. Each of these grid regions 13a and 13b/13b is disposed so that the diffracting directions differ from each other. Concretely, the grid region 13a is provided by orienting the diffraction in the direction of the axis Y, whereas the grid regions 13b and 13b are provided by orienting the diffraction in the direction of the axis X, respectively. Note that the direction which crosses the track 9 of the optical disc 4 at right angle is represented to be the X-axis direction, whereas the tangent direction of the track 9 which crosses the X-axis direction at right angle is represented to be the Y-axis direction. The light beam 2 emitted from the semiconductor laser 1 permeates the holographic element 13, and then, only the zero-dimensional diffracted light becomes the non-astigmation condensed spot beam 10a which is condensed onto the track 9 on the optical disc 4 by the condensing lens 3. If the holographic element 13 were manufactured so that the equivalent zero-dimensional diffraction effect can be achieved in the grid regions 13a and 13b/13b, the condensing lens 3 can condense the zero-dimensional diffracted light while properly maintaining the distribution of the intensity of the emitted light beam 2, thus, the light intensity cannot be distributed inconsistently. As shown in FIG. 8, the holographic element 13 has the phase-type diffraction grid which is composed of $SiO_2$ or $TiO_2$ evaporated on a glass substrate or relief which is integrally molded on a plastic substrate. The phase-type diffraction grid is manufactured so that the grid regions 13a and 13b/13b can be provided with the equivalent thickness "d" and the refraction index $\eta$, respectively. When the wave length is $\lambda$ in the vacuum, beams $\alpha$ and $\beta$ permeating the holographic element 13 generate the phase difference volume $(\eta-1)d\cdot 2\pi/\lambda$. When there are the equivalent phase difference values in the grid regions 13a and 13b/13b, the zero-dimensional diffractive light intensity in these grid regions is also equivalent to each other. The respective grid regions 13b, 13b have the point source of light disposed at the position of the semiconductor laser 1 and the interference stripe pattern corresponding to the moment when the two light beams from the astigmatic light source having the circle of least confusion at the center of the main detecting unit 7t of the photodetector 7.

Figure 9:
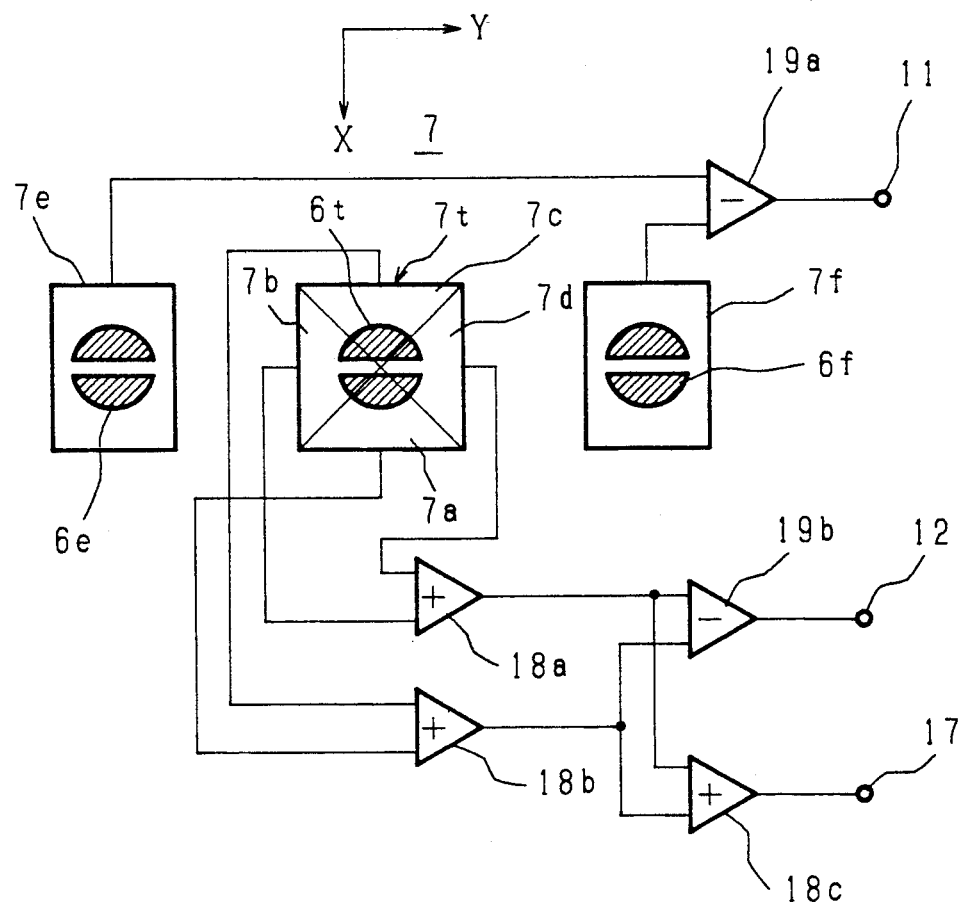
FIG. 9 is a block diagram of the photodetector of a optical head apparatus related to the invention.
Figure 10:
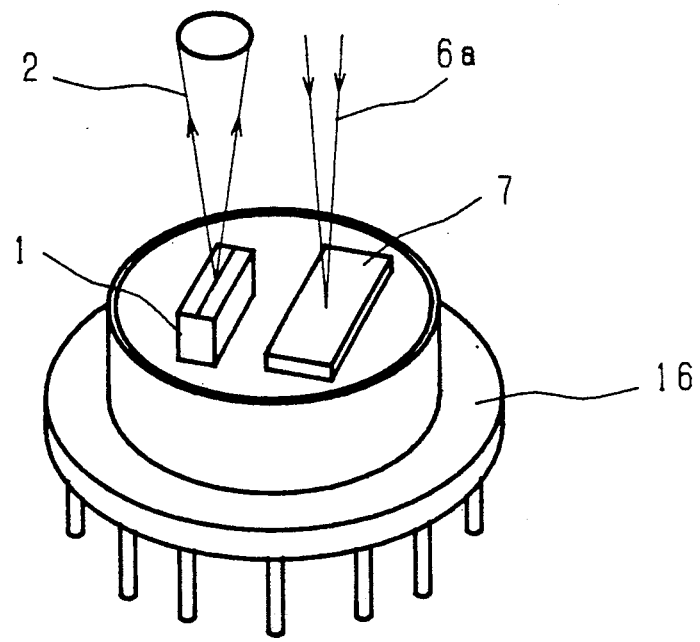
FIG. 10 is a perspective view of a hybrid element.

In the structure as mentioned above, the light beam incident upon the grid region 13a of the emitted light beam 2 permeating the holographic element 13 is split into three fluxes, which are then made into the three condensed spot beams 10a, 10e, and 10f on the optical disc 4 by the condensing lens 3. These three condensed spot beams 10a, 10e, and 10f diffuse and reflect themselves from the optical disc 4 before making up the reflected light beam 6. The reflected light beam 6 again enters into the holographic element 13 through the condensing lens 3. Of the reflected light beam 6, only the flux beam which entered into the grid regions 13b/13b is oriented to the photodetector 7. After being diffracted, this flux beam becomes the reflected light beams 6t, 6e, and 6f as shown in FIG. 9 before being received by the photodetector 7. Due to the presence of the grid regions 13b and 13b of the holographic element 13, astigmatism is generated in the reflected light beam 6t. The reflected light beam 6t is then received by the main detecting unit 7t, then, the photoelements 7a through 7d and the arithmetic operating elements 18 and 19 generate the reproduction signal 17 and the focusing error signal 12. On the other hand, the reflected light beam 6e and 6f are received by the photoelements 7e and 7f. The tracking error signal 11 is generated from the signals output from the photoelements 7e and 7f through the arithmetic operating element 19b. Of the reflected light beam 6, only those flux beams which again entered into the grid region 13a are split into three fluxes to generate a total of nine light beams, which are eventually made into the diffracted light beams 14a through 14e by partially overlapping themselves. Nevertheless, since the diffracting direction is different between the grid regions 13b and 13b, those diffracted light beams 14a through 14e cannot be received by the photodetector 7. As a result, the photodetector 7 detects only the necessary reflected light beam 6a without allowing the infiltration of the unnecessary diffracted light beams 14a through 14e at all.

According to the structure, since the optical head apparatus embodied by the invention is capable of reducing the diffraction angle $\theta$ of the holographic element 13, the manufacturer can smoothly install the holographic element 13 without providing much distance between the semiconductor laser 1 and the photodetector 7. Accordingly, the holographic element 13 can be composed of a hybrid element 16 consisting of the semiconductor laser 1 and the photodetector 7 which are jointly sealed in the same package shown in FIG. 10 as is well known in Japanese Patent Application Laid-Open No. 62-255169 (1987).

The preferred embodiment of the invention provides the grid regions 13a and 13b of the holographic element 13 with the different diffraction directions. It may be possible for this embodiment to provide the grid regions 13a and 13b with the different diffraction angles.

Figure 11:
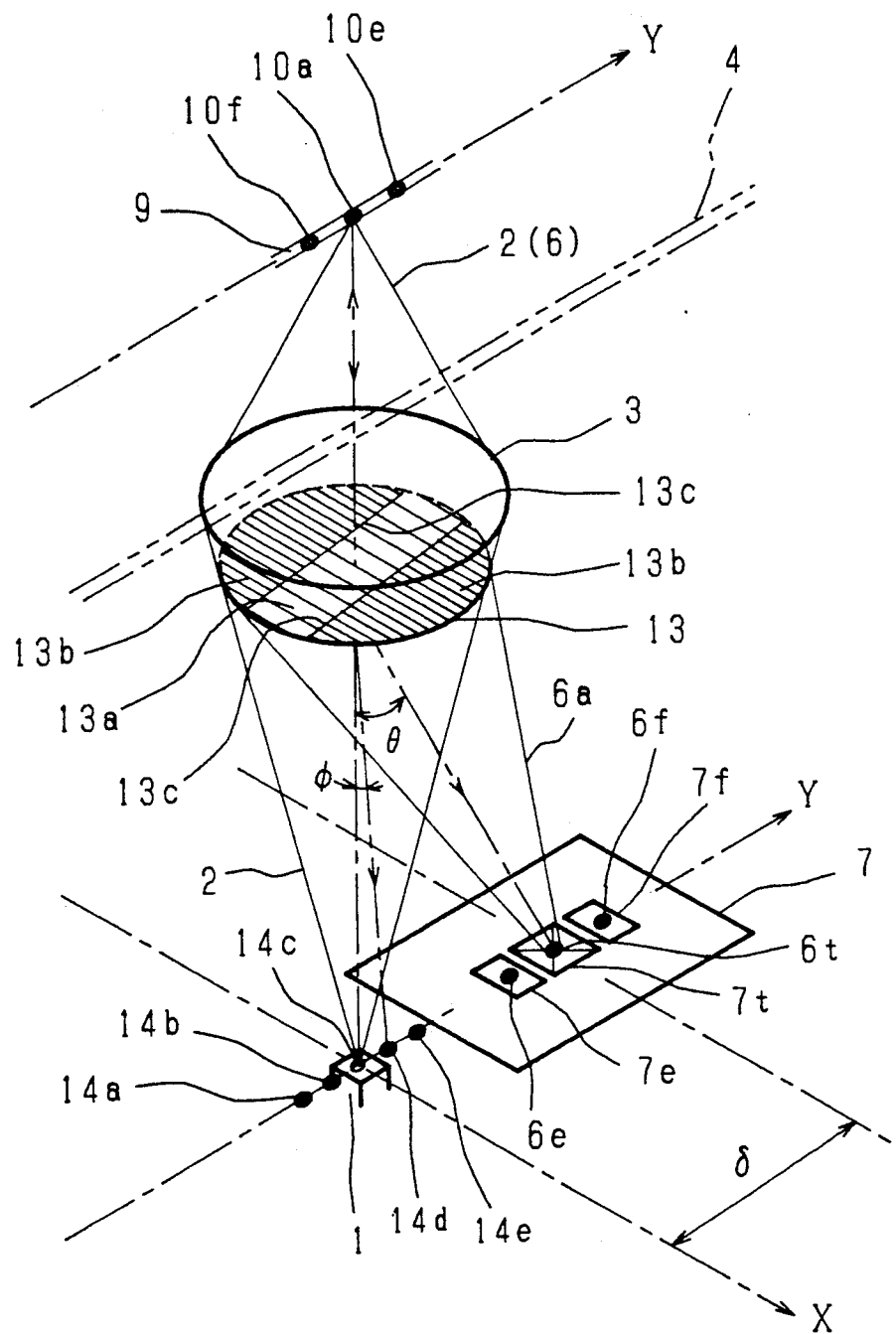

Another preferred embodiment of the optical head apparatus related to the invention is shown in FIG. 11. In order to provide the grid regions 13a and 13b of the holographic element 13 with the different diffraction angles, the grid region 13a is provided with the diffraction angle $\phi$ and the grid region 13b with the diffraction angle $\theta$, where the angle $\theta$ is adapted to be wider than the angle $\phi$. The holographic element 13b has the stripe pattern so that the reflected light beam 6a can be provided with the astigmatism. If the photodetector 7 were oriented to the diffracting direction on the Y-axis by employing the holographic element 13, then the reflected light beams 6t, 6e, and 6f are received by the photodetector 7 without allowing the infiltration of the unnecessary light beams 14a through 14e at all, as a result, this embodiment can achieve the aimed effect identical to that is achieved by the above embodiment.

Figure 12:
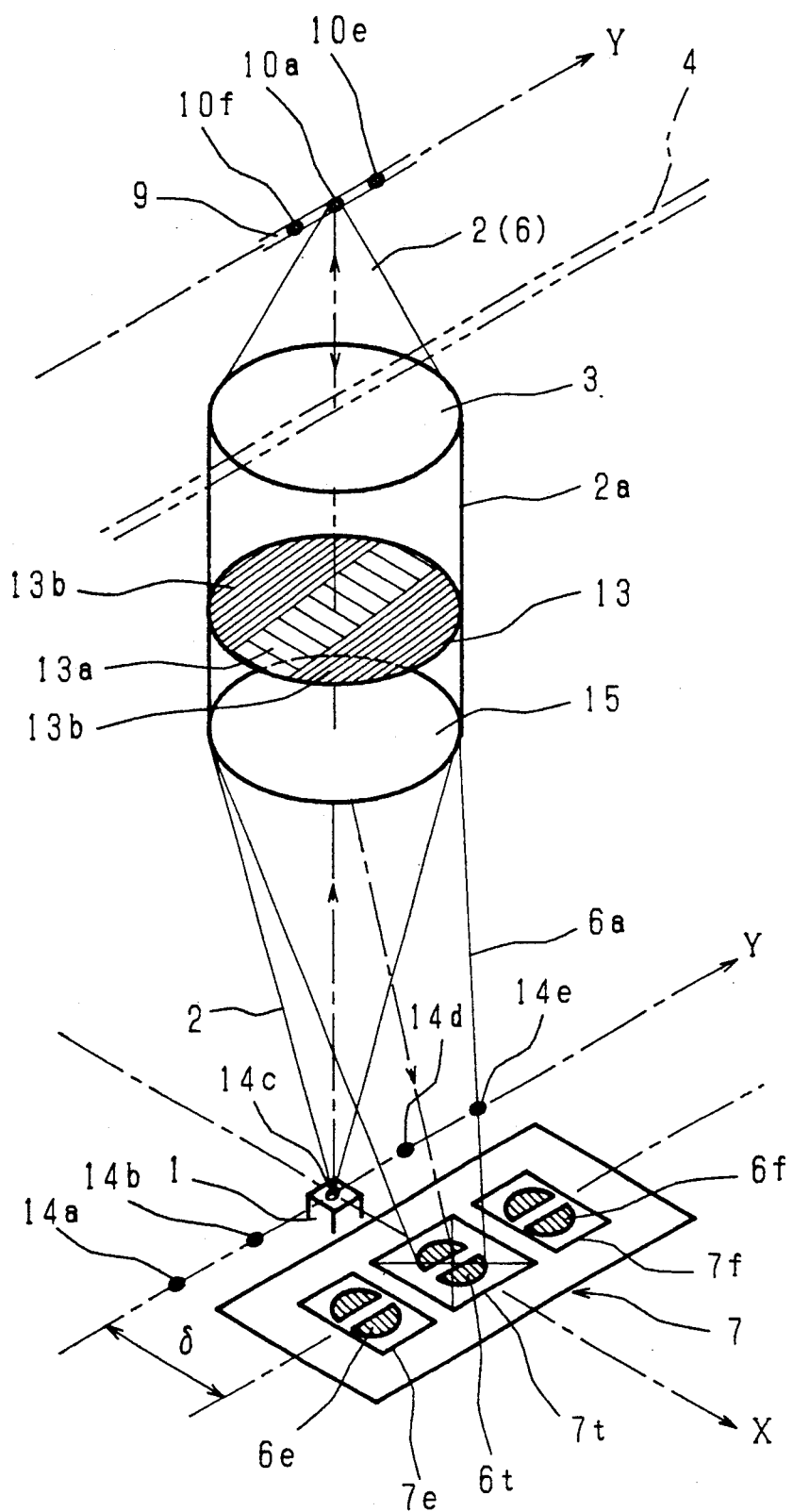

The borderline 13c between the grid regions 13a and 13b of the holographic element 13 is straight in the direction of the axis Y. However, the borderline 13c may be set in the optional direction, or it may be of the curved line. The grid regions 13a and 13b may be divided into the desired number. The holographic element 13 may not necessarily be disposed in the light beam 2 diffused and emitted from the semiconductor laser 1, but it may also be disposed in the parallel light beams 2a composed of the light beam 2 diffused and emitted from the collimator lens 15 as shown in FIG. 12.

Figure 13:
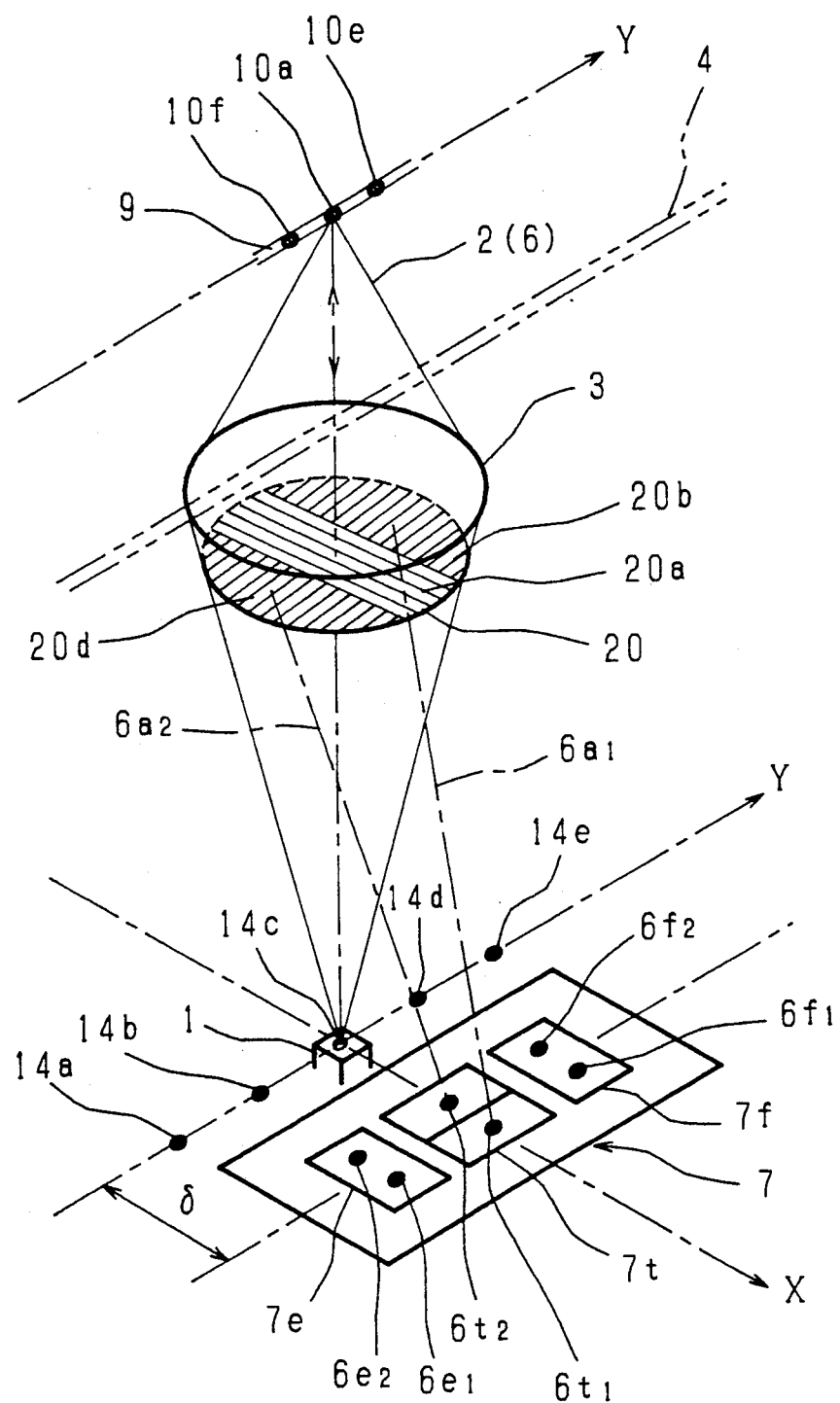
Figure 14A:
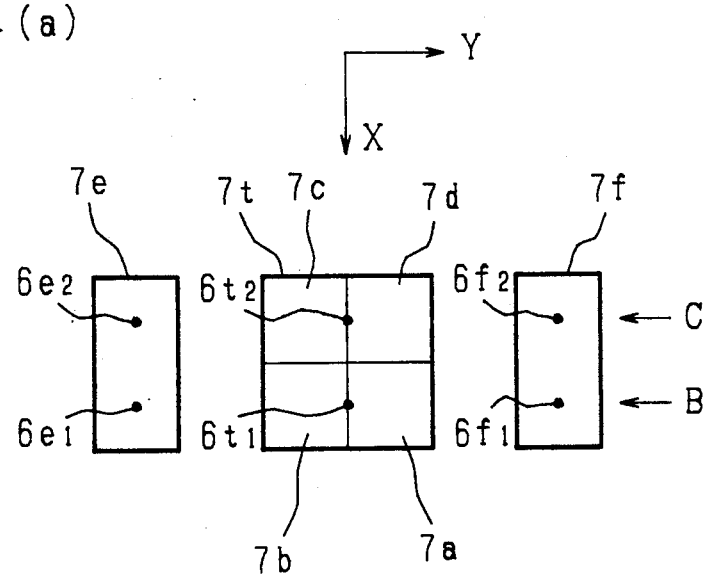
Figure 14B:
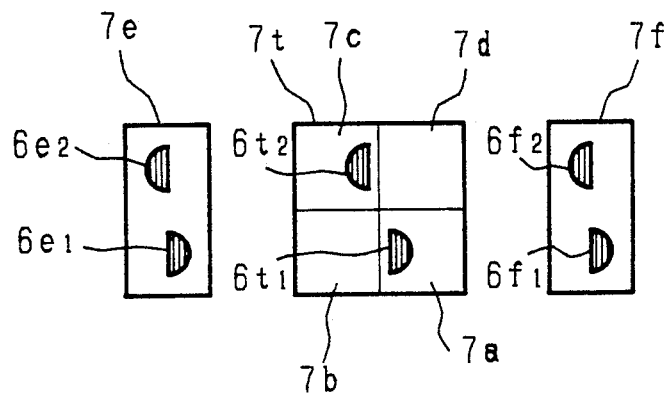
Figure 14C:
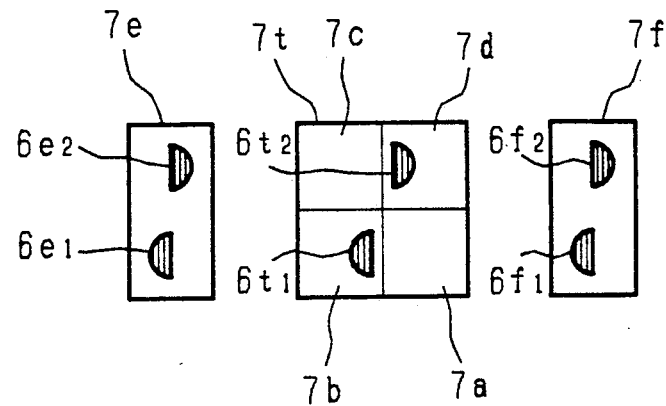

To detect the deviated focus, the embodiment of the invention uses the astigmatism. However, the invention also allows the use of another means. Another preferred embodiment of the optical head apparatus under the Foucault system which is well known in Japanese Patent Application Laid-Open No. 54-140533 (1979) is shown in FIGS. 13 and 14. The holographic element 20 is composed of the grid region 20a having the function of the diffraction grid 5 which generates three light beams and the grid regions 20b and 20d having the beam splitting function and the function for detecting the deviated focus. The reflected light beams 6a1 and 6a2 diffracted by the grid regions 20b and 20d are condensed and radiated against the different positions of the photodetector 7 in the condition free from astigmatism. Since the reflected light beams 6a1 and 6a2 are composed of three reflected light beams 6t, 6e, and 6f from the condensed spot beams 10a, 10e, and 10f respectively, as shown in FIG. 14-a, a total of six reflected light beams are generated. Those reflected light beams 6e1, 6t1, and 6f1 of the line B are the primarily diffracted beams from the grid regions 20b, and likewise, those reflected light beams 6e2, 6t2, and 6f2 of the line C are the primarily diffracted beams from the grid region 20d. These grid regions 20b and 20d have the grid pattern corresponding to the stripe pattern respectively when the light beam from the light source set to the positions of the reflected light beams 6a1 and 6a2 interferes with the light beam from the semiconductor laser 1 on the surface of the holographic element 20. Instead of the stripe pattern, a grid pattern of a substantially straight line may also be used. When the optical disc 4 moves in the direction of the light axis due to the surface oscillation, the positions of the reflected light beams 6e, 6t, and 6f vary on the photodetector 7 respectively. In other words, these positions vary as shown in FIG. 14-b when the optical disc 4 approaches the condensing lens 3, while these positions also vary as shown in FIG. 14-c when the optical disc 4 goes away from the condensing lens 3. Accordingly, the focusing error signal 12 can be generated by calculating the expression $[(7a+7c)-(7b+7d)]$. The tracking error signal 11 can be generated by executing the same process as those of other embodiments. At this time, since the reflected light beams 6a1 and 6a2 are split up, there is no interference between them. Since the reflected light beams 6a1 and 6a2 have the identical phase, there exists no problem. In addition, since the unnecessary diffracted light beams 14a through 14e do not enter into the photodetector 7, the system can maintain satisfactory characteristic of the reproduction signals and achieve the same effect as the above-mentioned embodiment.

Figure 16:
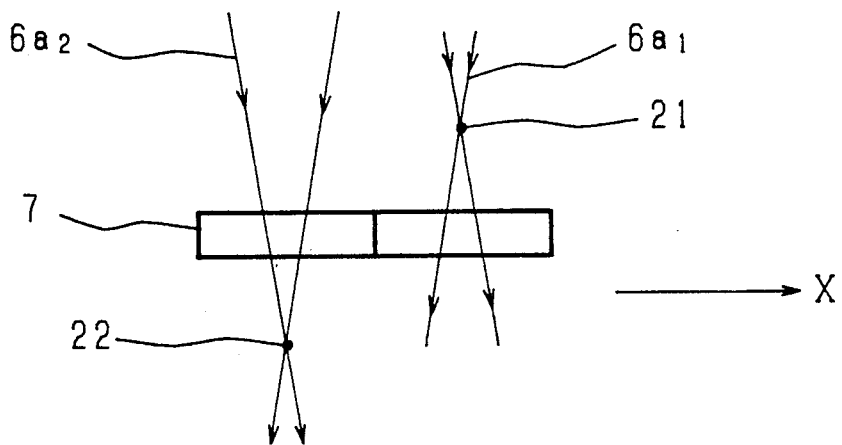
FIGS. 14 through 16 are schematic charts showing the condensed condition of the reflected light beam respectively when operating the optical head apparatus related to the invention.
Figure 15A:
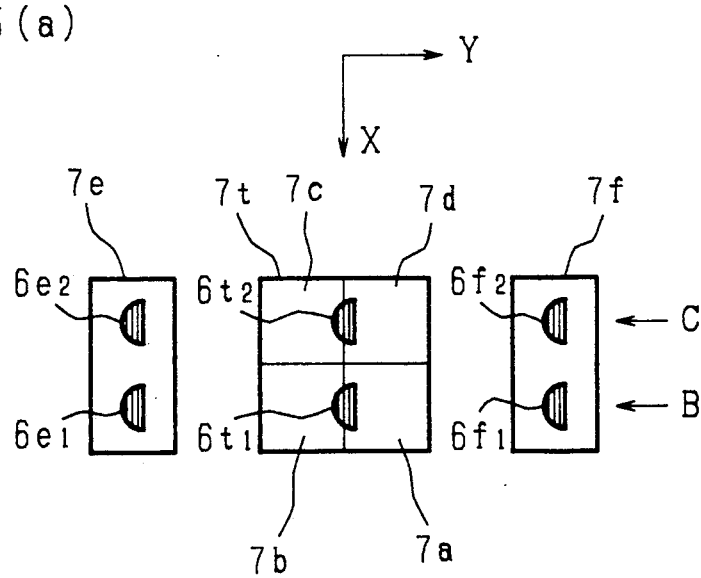
Figure 15B:
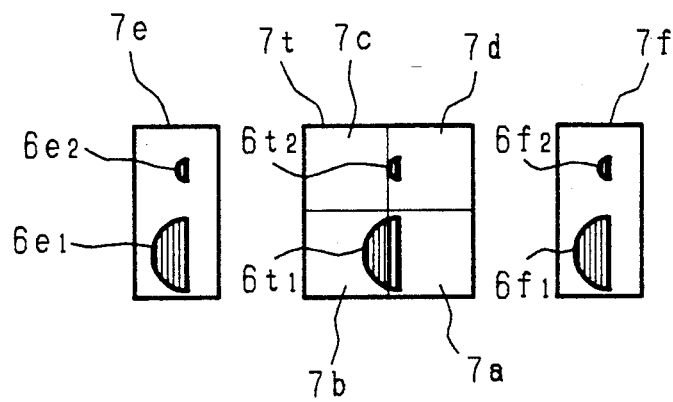
Figure 15C:
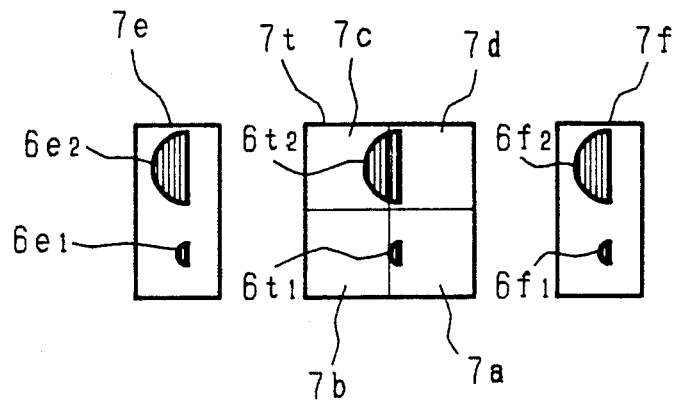

The grid regions 20b and 20d of the holographic element 20 are manufactured so that the diffracted light in the grid region 20b, i.e., the reflected light beam 6a1, can be condensed in front of the photodetector 7 and the reflected light beam 6a2 in the grid region 20d can be condensed behind the photodetector 7 before eventually being received by the photodetector 7 as shown in FIGS. 15 and 16. In this case, as shown in FIG. 16, the reflected light beam 6a1 focuses a condensed point 21 and the reflected light beam 6a2 also focuses a condensed point 22, respectively. To generate the reflected light beams 6a1 and 6a2, as shown in FIGS. 15 and 16, the grid regions 20b and 20d are designed to form the grid configuration corresponding to the interference pattern when the light beam having the light source at the positions of the condensing points 21 and 22 interferes with the light beam emitted from the semiconductor laser 1. Instead, a grid generally approximating the image may also be used. When the light beams are precisely condensed on the optical disc 4, as shown in FIG. 15-a, the light beams 6e1, 6t1, and 6f1 reflected from the grid region 20b having the identical flux-size are radiated against the line B, whereas those light beams 6e2, 6t2, and 6f2 reflected from the grid region 20d having the identical flux-size are radiated against the line C so that the spot radiation can be done by dividing the reflected light beams 6t1 and 6t2 into two even portions in the detection region of the main detecting unit 7t across the splitting line in the X-axis direction. When the optical disc 4 approaches the condensing lens 3, as shown in FIG. 15-b, the reflected light beam 6a varies on the photodetector 7, where the radiated spots of the reflected light beams 6e1, 6t1, and 6f1 in the line B expand themselves, whereas the radiated spots of the reflected light beams 6e2, 6t2, and 6f2 in the line C contract themselves. When the optical disc 4 goes away from the condensing lens 3, as shown in FIG. 15-c, the radiated spots of the reflected light beams 6e1, 6t1, and 6f1 in the line B contract themselves, whereas the reflected light beams 6e2, 6t2, and 6f2 in the line C expand themselves. Accordingly, the focusing error signal 12 is generated by the expression $[(7a+7c)-(7b+7d)]$. Since those unnecessary diffracted light beams 14a through 14e do not enter into the photodetector 7, the system can obtain satisfactory reproduction characteristic identical to other embodiments.

Figure 19A:
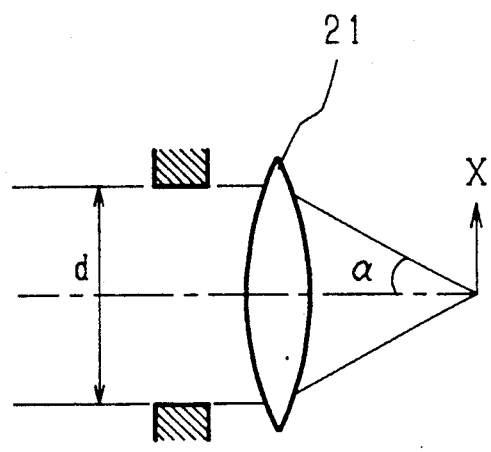
FIGS. 19 (a) and (b) are conceptive charts which explain the aperture and the diameter of the condensed spot beams respectively.
Figure 19B:
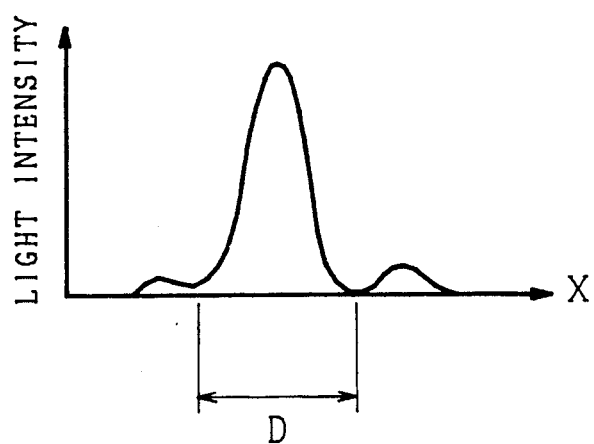

Next, another preferred embodiment of the optical head apparatus of the invention is described below. For example, like the optical head apparatus shown in FIG. 7, if the grid region 13a of the holographic element 13 were of the substantially rectangular shape extending in the direction of the data track Y, three spot beams on the data track 9 do not turn themselves into the circular condensed spot beams shown in FIG. 3, but these spot beams turn into the elliptic shape with the condensed spot beams 10e and 10f extending themselves in the direction X as shown in FIG. 18. Generally, when condensing the light beam permeating the aperture shown in FIG. 19-a, if the number of the aperture of the condensed light beam is NA (where NA=sin α), then, the distribution of the light-intensity of the condensed spot beam looks as shown in FIG. 19. When the aperture is round, the spot-beam diameter "D" is 1.22 (λ/NA). When the aperture is rectangular, "D" is λ/NA. When the focusing distance of the condensing lens is "f", the value of "d" determining the effective aperture diameter essential for realizing the condensed light beam of NA is given by applying the expression d=2·f·NA. As a result, the greater the value of "d", the greater the number NA of the aperture of the condensed light beam, and as a result, the spot diameter "D" diminishes.

In order to read about 1 micron of the pit of the optical disc 4, 0.45 through 0.55 of the NA value is generally used for the condensing lens 3. FIG. 7 merely illustrates an aperture portion (called an effective aperture diameter) of the emitted light beam 2 of the holographic element 13 corresponding to NA. Assuming that the illustrated effective aperture diameter of the holographic element 13 is "d", the condensed spot beam 10a of the zero-dimensional light beam permeating the effective aperture diameter "d" has about 1 micron of the spot-beam diameter, thus allowing data to be read out. On the other hand, the condensed spot beams 10e and 10f of the diffracted light from the grid region 13a of the holographic element 13 have the Y-directional aperture diameter "d" respectively, whereas the X-directional aperture diameter is narrower than "d". If the X-directional aperture is d/5 for example, as shown in FIG. 18, the X-directional spot-beam diameter turns into the elliptic spot beam which is five times wider than the Y-directional spot-beam diameter. In other words, the Y-directional spot-beam diameter is about 1 micron which generally corresponds to the diameter of the condensed spot beam 10a, whereas the X-directional spot-beam diameter is about 5 microns. If the X-directional interval of the data track 9 is about 1.6 microns, then the condensed spot beams 10e and 10f runs over more than two data tracks. Since the tracking error signal uses the signal component in the direction of traveling the data track 9, i.e., in the direction of X, it is desired that the X-directional spot-beam diameter of the condensed spot beams 10e and 10f is as narrow as about 1 micron.

Figure 20:
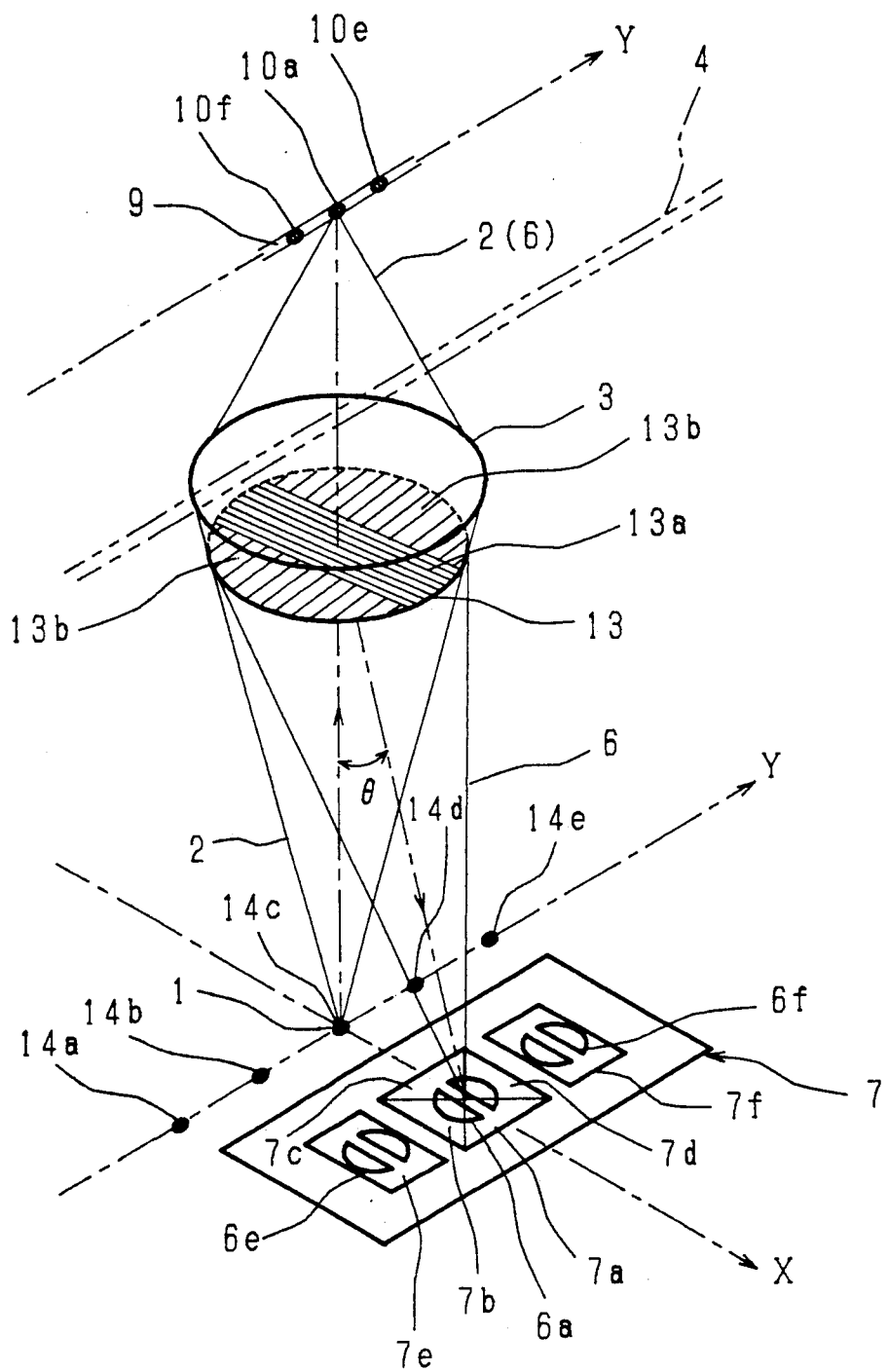

Accordingly, when implementing this embodiment shown in FIG. 20, the grid region 13a of the holographic element 13 has substantially rectangular apertures extending in the X-direction, where the diameter of the X-directional aperture is equal to the effective aperture diameter of the emitted light beam 2 at the holographic element 13. Those reference numerals identical to those of FIG. 7 shown in FIG. 20 represents the identical portions.

Figure 21:
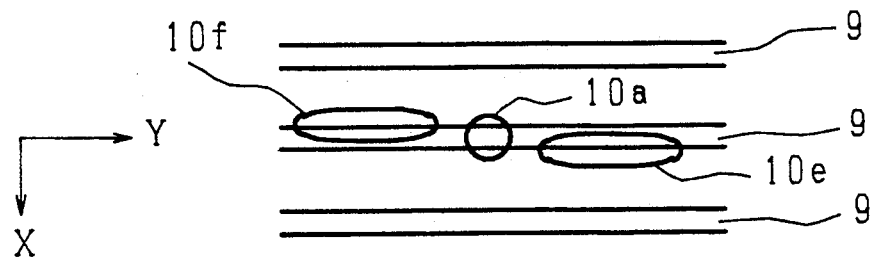

According to the structure mentioned above, the ± primarily diffracted permeable light by the grid region 13a radiates the optical disc 4 as the condensed spot beams 10e and 10f. FIG. 21 illustrates the state of three spot beams on the data track 9. The number of the apertures of NA of the condensing lens 3 is set so that the condensed spot beam 10a is small enough to fully read the data stored in the data track 9, i.e., about 1 micron of the condensed beam diameter for example.

The X-directional spot diameters of the condensed spot beams 10a, 10e and 10f are almost equivalent to each other. Since the X-directional spot-beam diameter is less than about 1.6 microns of the X-directional interval of the data track 9, the condensed spot beams 10e and 10f are capable of reading the signals traveling the X-directional data tracks 9. As a result, like the generation of the tracking error signal from the arithmetic operation output 11 shown in FIG. 9, the tracking error signal can be generated by detecting the differential movement of the reflected light beam of the condensed spot beams 10e and 10f.

The condensed spot beams 10e and 10f shown in FIG. 21 have larger spot diameter in the direction of the data track 9 respectively. If the Y-directional aperture diameter of the grid region 13a of the holographic element 13 were about one-fifth the aperture diameter in the X direction, then the spot diameters of the condensed spot beams 10e and 10f in the direction of the data track 9 is as large as 5 microns respectively. As a result, these condensed spot beams 10e and 10f are incapable of reading the original reproduction signal being present in the Y direction.

As mentioned earlier, since the tracking error signal is present in the X direction, the signal in the Y direction is the noise component against the tracking error signal. Since the signal in the Y direction consequently does not mix into the tracking error signal in this embodiment, the optical head apparatus of the invention is possible to securely generate satisfactory tracking error signals having extremely high signal-to-noise (S/N) ratio.

Figure 22:
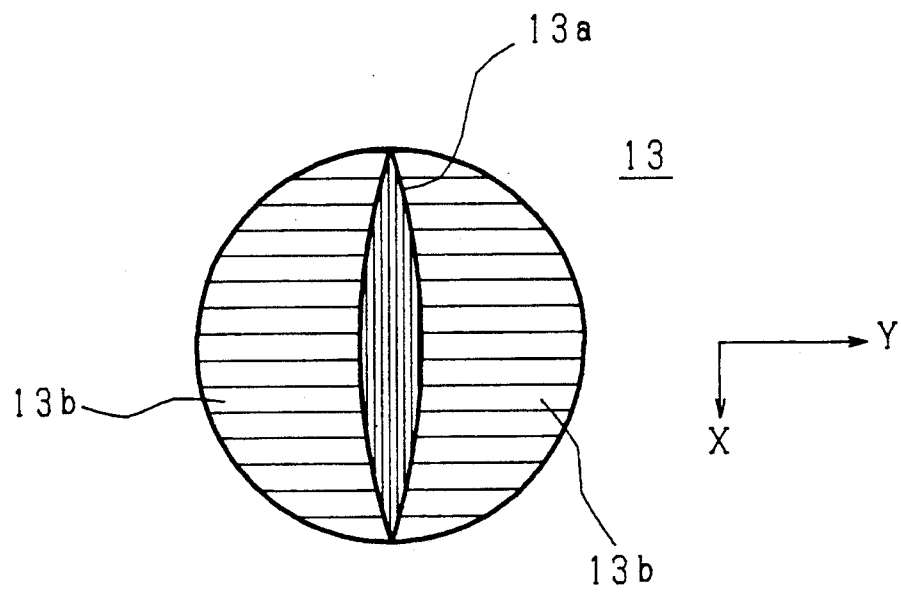
FIGS. 22 and 29 (a)-(d) are schematic charts showing other grid patterns of the holographic element respectively.

When implementing the above embodiment, the grid region 13a of the holographic element 13 is split from the grid region 13b by means of the straight line which extends in the X direction, and yet, the grid region 13a has rectangular apertures. However, the aperture may also be of the elliptic shape as shown in FIG. 22. In this case, sufficient opening is given in the direction perpendicular to the data track.

Figure 23:
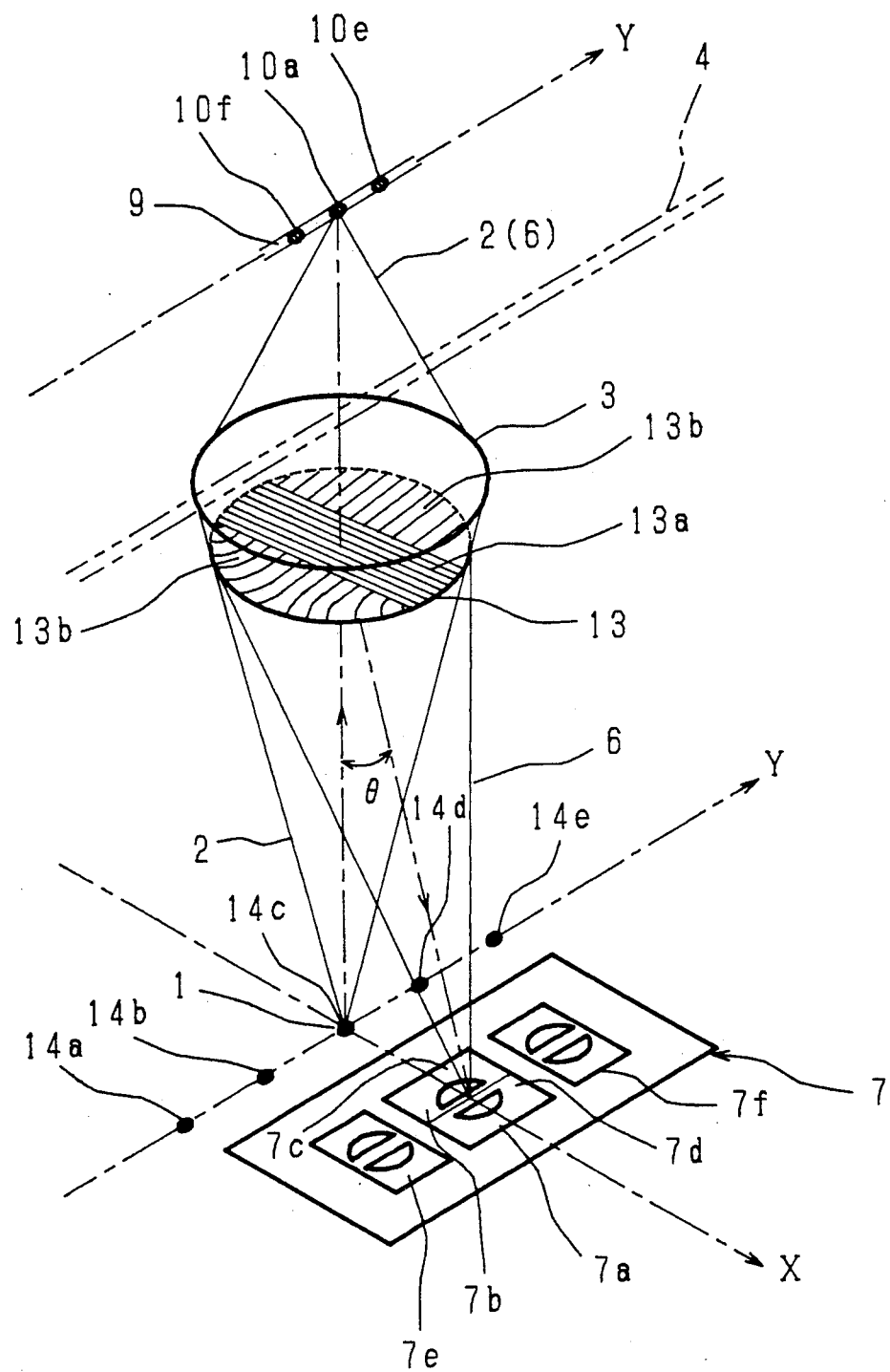
Figure 24:
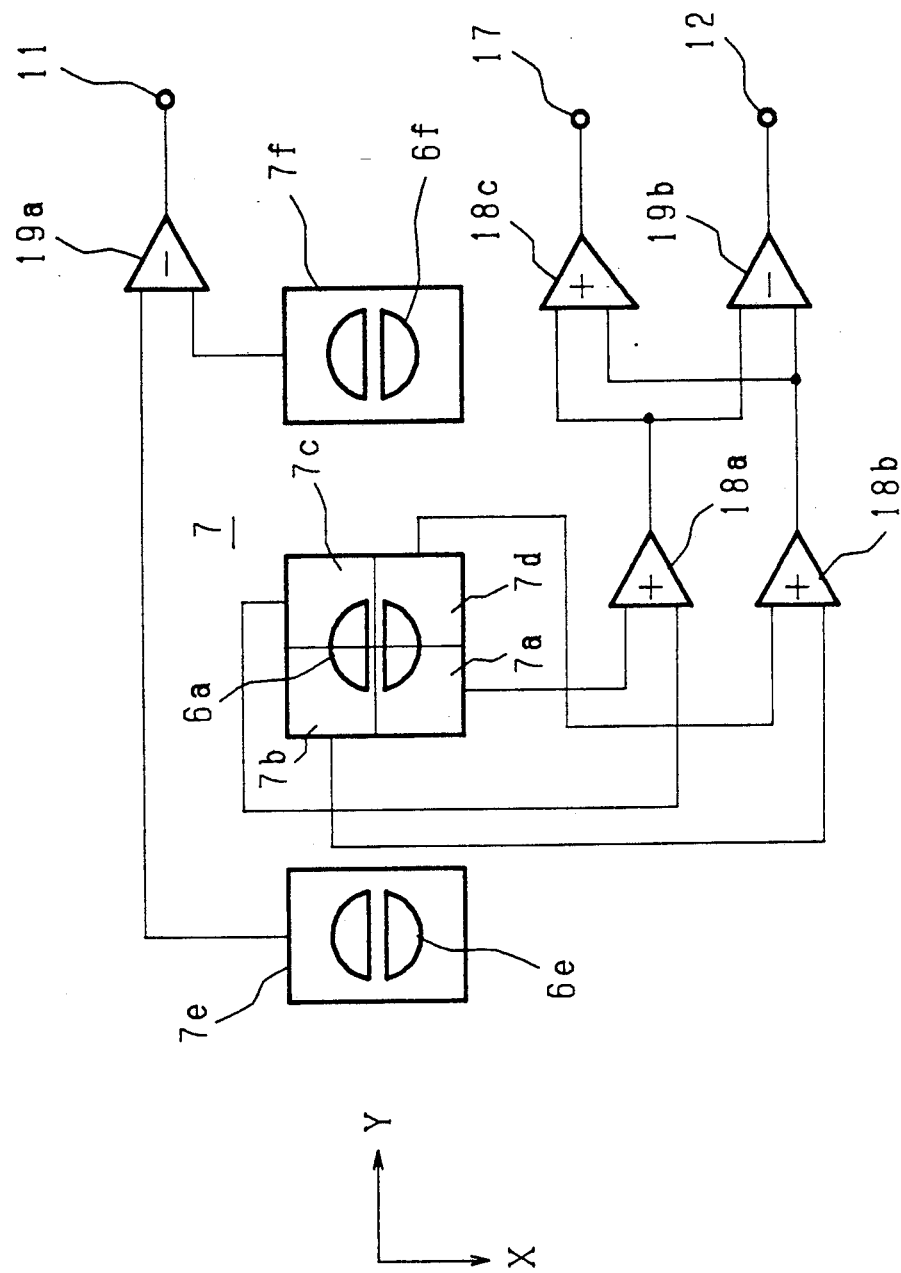
FIG. 24 is a block diagram of the photodetector of the optical head apparatus shown in FIG. 23.

Furthermore, the each grid region 13b provides the diffracted light 6 with the astigmatism having the focal line in the direction of X and Y in the above embodiment. However, for another embodiment as shown in FIG. 23, it may be designed that the each grid region 13b of the holographic element 13 provides the diffracted light 6 with the astigmatism having the focal line in the directions of X and Y. FIG. 24 illustrates the configuration of the photodetector 7 when implementing the above embodiment. The reproduction signal, the tracking error signal, and the focus error signal are generated from those signals output from the arithmetic operating elements 17, 11 and 12 respectively.

Next, another preferred embodiment of the optical head apparatus of the invention is described below. For example, when operating the optical head apparatus shown in FIG. 7, if condensing means 3 were transferred in the X direction in response to the tracking error signal 11, the spot beam 6t radiating against the quartered detection regions 7a through 7d of the photodetector 7 is displaced in the X direction. Then, as shown in FIG. 16, more volume of the spot beam 6a radiates the detection region 7a or 7c present in the X direction among the quartered detection regions 7a through 7d. As a result, even if the condensed spot beam 10c were correctly focused, the focus error signal 17 output from the arithmetic operating element 18c offsets itself without being reduced to zero, thus, the focus of the condensed spot beam 10a collapses on the data-recording medium 4, as a result, the performance characteristic of the reproduction signal 17 output from the arithmetic operating element 18c degrades.

The diffraction angle θ of the holographic element 13 is given by the expression $\sin\theta = \lambda/P$, where P is the average grid cycle of the each grid region 13b and λ the wave length of the light source 1. However, the wave length λ of the semiconductor laser 1 functioning as the light source is dependent on temperature. As a result, if the wave length λ slightly extends, the diffraction angle θ also expands and the spot beam 6a displaces itself in the X direction, thus incurring offset to the focus error signal.

Figure 25:
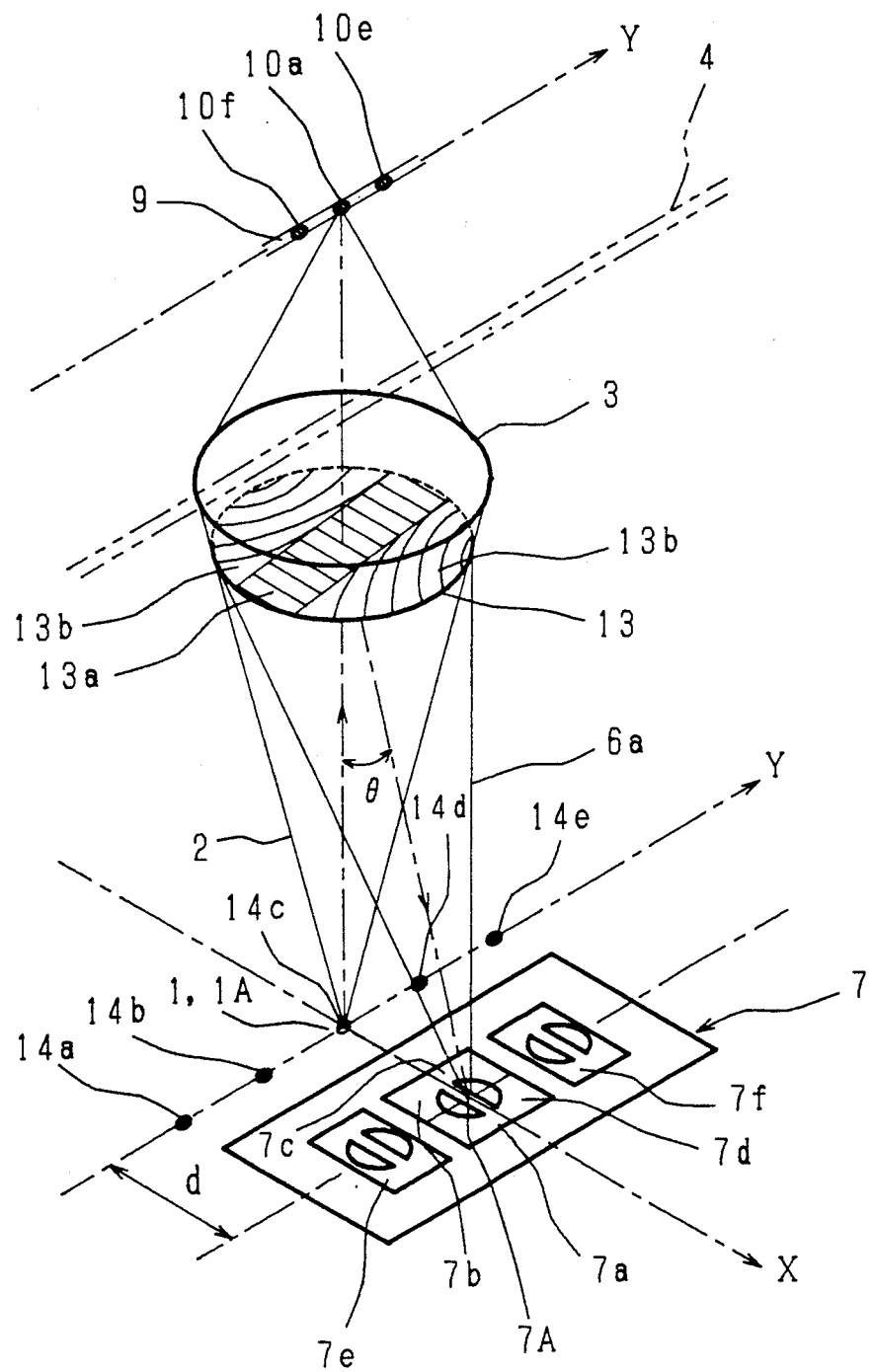

As shown in FIG. 25, the optical head apparatus related to this embodiment is provided with the following; the light source 1, condensing means 3 which forms the light beam 2 emitted from the light source 1 into the condensed spot beams 10a, 10e and 10f which radiate the data tracks 9 on the data-recording medium 4, the holographic element 13 which separates the light beam 6 reflected from the data-recording medium 4 from the emitted light beam 2 and which provides the reflected light beam 6a with the astigmatism, and the photodetector 7 which receives the reflected light beam 6a.

Figure 26A:
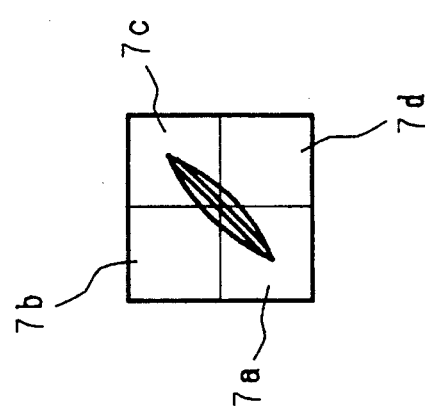
FIGS. 26 (a) through (c) are schematic charts showing the condensed condition of the reflected light beam when operating the optical head apparatus shown in FIG. 25 respectively and FIG. 27 is a block diagram of the photodetector of the optical head apparatus shown in FIG. 25.
Figure 26B:
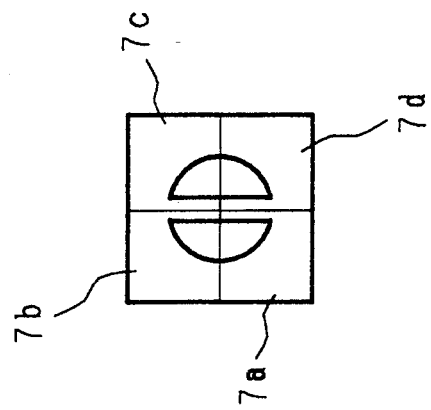
Figure 26C:
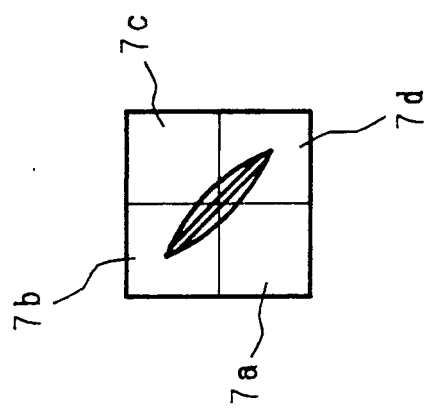
Figure 27:
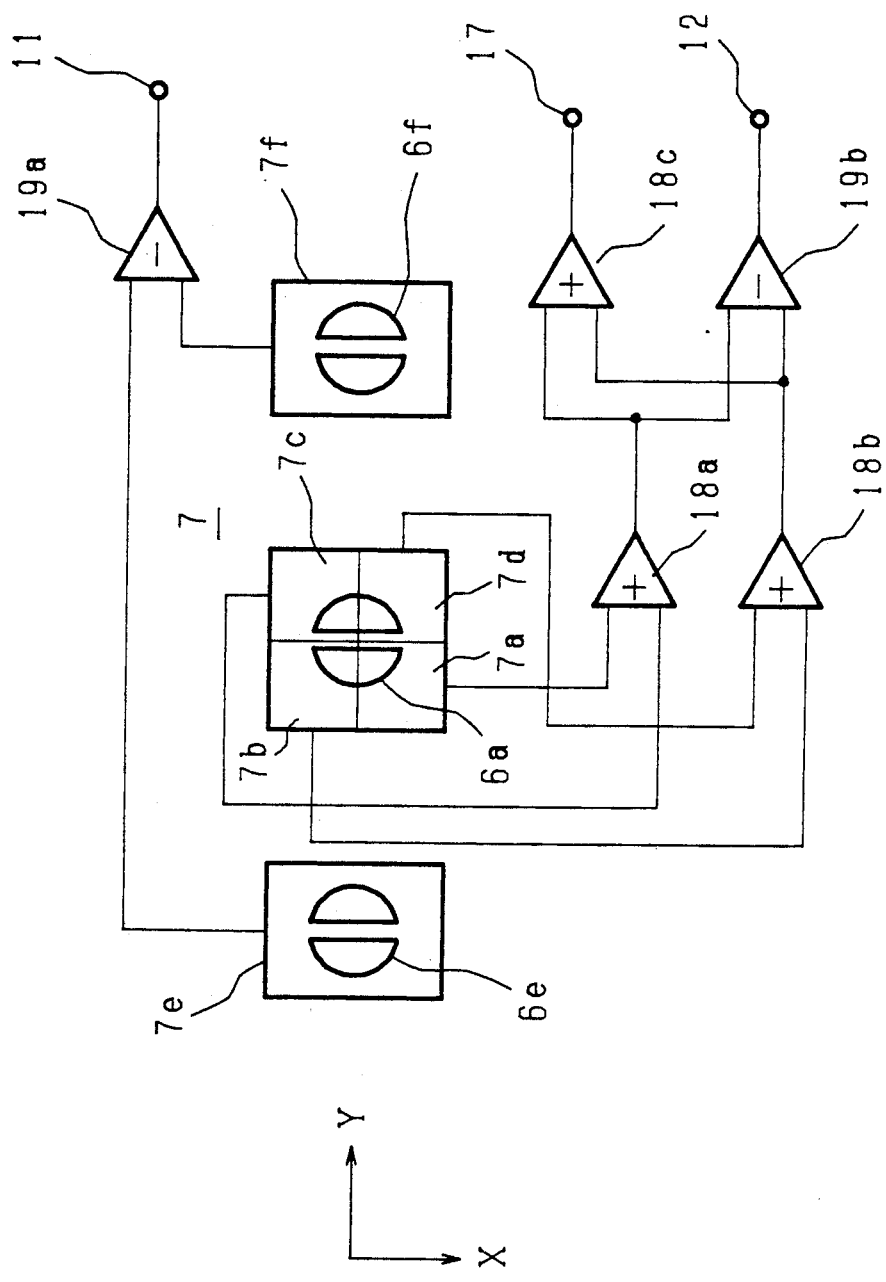

The center of the quartered detection regions 7a through 7d of the photodetector 7 is disposed at the position apart from the light source 1 by distance "d" in the X direction. The quartering lines are disposed in the X direction and the Y direction which crosses the X direction at right angle. In the case in which the non-astigmation light source 1a is set to the position corresponding to the light source 1 and the astigmatic light source 7a being set to the position corresponding to the center of the photodetector 7, the holographic element 13 has the grid pattern corresponding to the interference stripe which provides the photodetector 7 with the drawn circle of the least confusion having the focal line at the positions apart by about +45° and about −45° from the traveling direction (Y direction) of the data track 9 by the effect of the interference between the light beam of the non-astigmation light source 1A and the light beam of the astigmatic light source 7A. When the focus against the data-recording medium 4 deviates, after permeating the holographic element 13 having the grid pattern mentioned above, the spot beam 6a varies itself on the quartered detection regions 7a through 7d of the photodetector 7 as shown in FIG. 26-a through c. The direction of the focal line varies by about ±45° against the traveling direction (Y direction) of the data track 9.

When operating the optical head apparatus having the structure as mentioned above, if the condensing lens 3 displaces itself in the X direction in response to the tracking error signal, the condensed spot beam 6a displaces in the Y direction on the quartered detection regions 7a through 7d of the photodetector 7. As a result, of those quartered detection regions 7a through 7d, the regions 7c and 7d receive much volume of light. However, since the regions 7c and 7d receive almost equivalent volume of additional light respectively, no variation occurs in the signal 12 output from the arithmetic operating element 19b, thus, no offset is generated in the focusing error signal. The same applies to the case when the condensed spot beam 6a displaces in the Y direction.

Next, when the condensed spot beam 6a displaces in the X direction as a result of the variation of the wave length of the light source 1, much volume of light is received by the quartered detection regions 7a and 7d of the photodetector 7. However, since no variation occurs in the signal output from the arithmetic operating element 19b, no offset is generated in the focusing error signal. The arithmetic operating elements 18c and 19a generate the reproduction signal and the tracking error signal.

Figure 28:
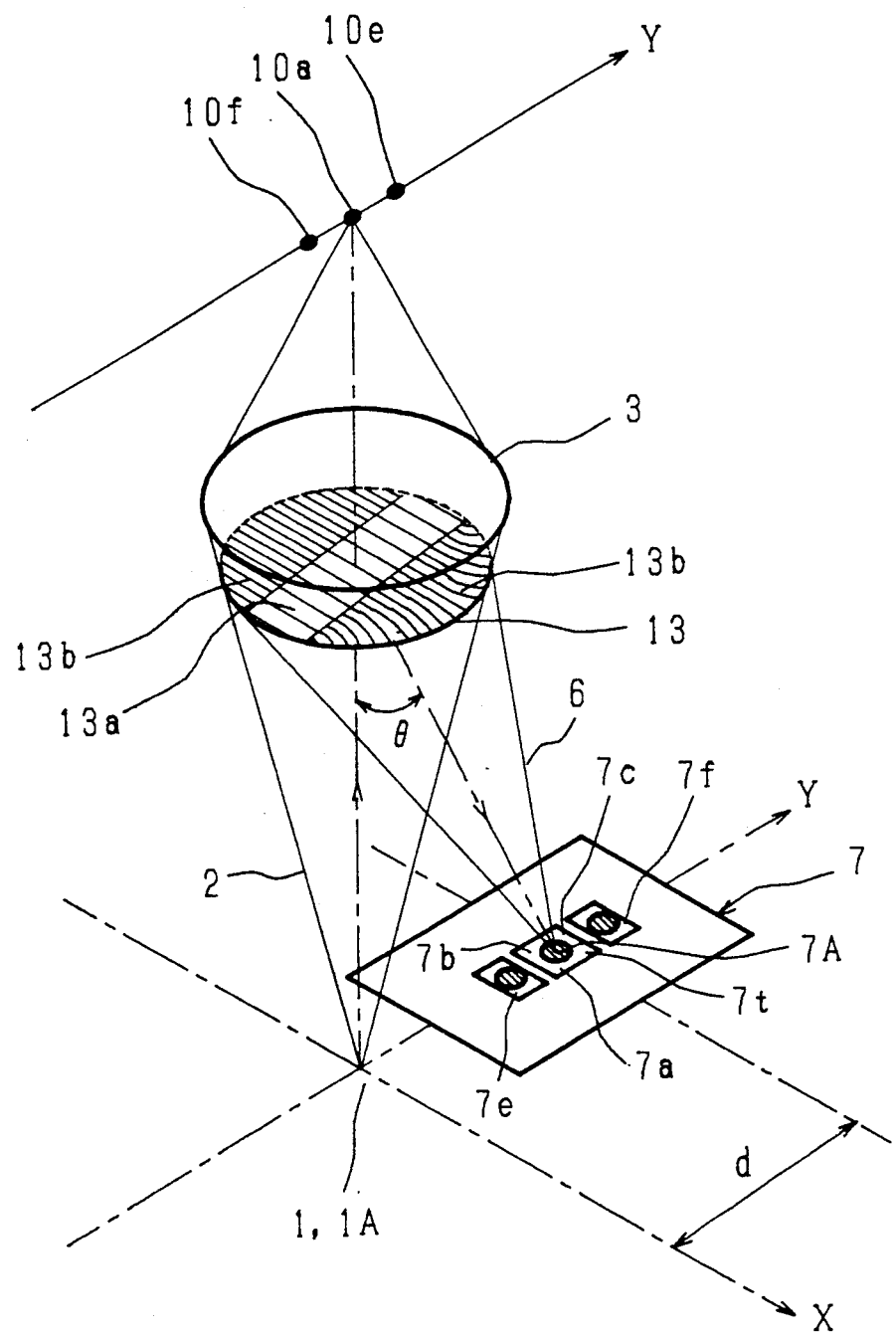
Figure 29A:
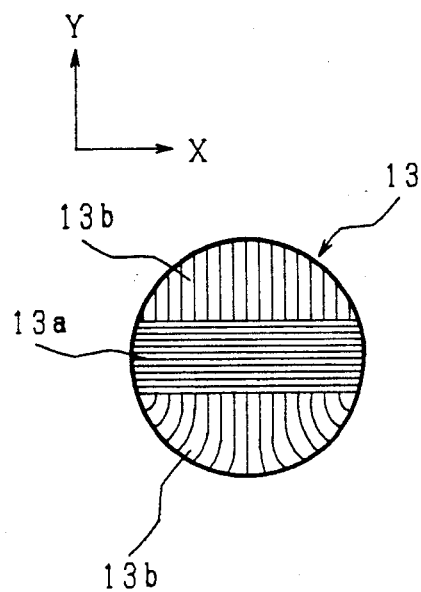
Figure 29B:
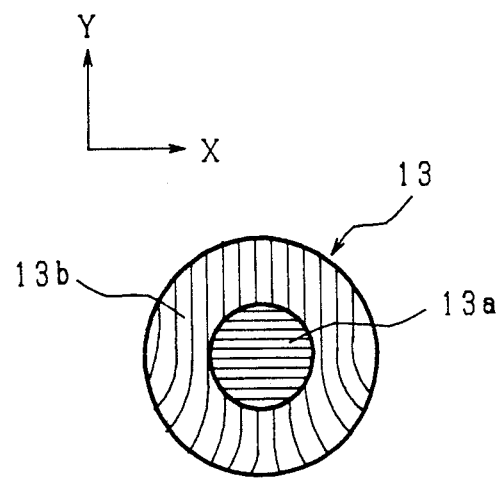
Figure 29C:
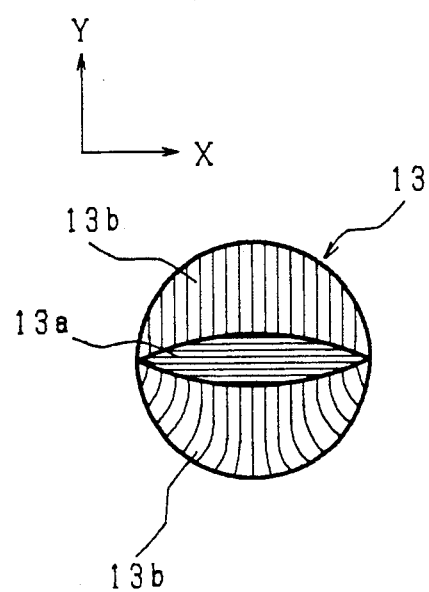
Figure 29D:
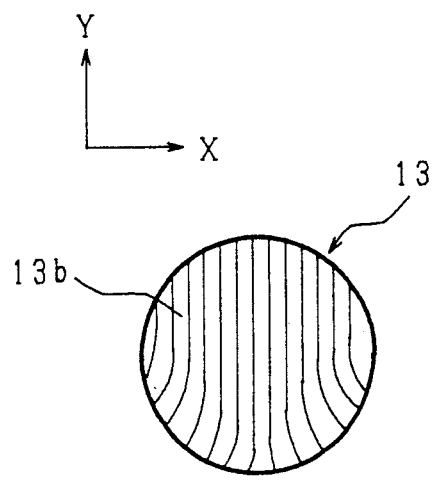

It should be understood that the spirit and the scope of the invention are not limited to those preferred embodiments described above. Desired effect identical to those of the foregoing embodiments can be achieved by implementing the following; disposition of the direction of the split line of the quartered detection regions 7a through 7d as per the X/Y directions at the position at which the photodetector 7 is apart from the Y direction (the traveling direction of the data track 9) by the distance "d" as shown in FIG. 28; and the provision of the grid pattern for the each grid regions 13b of the holographic element 13 so that the grid pattern is capable of corresponding to the interference stripe which draws the circle of the least confusion having the focal line which is apart from the X/Y directions by about 45°.

In addition, the invention may also provide the formation of those grid patterns of the holographic element 13 as shown in FIG. 29-a through FIG. 29-d.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An optical head apparatus comprising: a light source;

a recording medium on which data is recorded in a predetermined direction;

a condensing means for condensing the light beam emitted from said light source onto the recording medium;

a beam splitter for altering the irradiating direction of the reflected light beam from said recording medium;

said beam splitter comprising one holographic element being composed of at least two grid regions having diffraction lines oriented in different directions;

a photo detector for detecting the light beams reflected from said recording medium; and the first grid region of said holographic element splitting the light beam emitted from said light source into at least three light beams with different condensing positions on the path from said light source to said recording medium, and the second grid region of said holographic element being comprised of two sub-regions which are positioned on opposite sides of said first grid region and diffracting the light beam reflected from the recording medium and causing the light paths of said light beams to be different from the path of the light beam emitted from said light source to make the reflected light beam be bound for said photo detector.

2. The optical head apparatus as set forth in claim 1, wherein said light source and said photo detector are jointly sealed in the same package of a hybrid element.

3. The optical head apparatus as set forth in claim 1, wherein the border between said first and second grid regions is straight.

4. The optical head apparatus as set forth in claim 1, wherein said first and second grid regions are phase gratings where a height of the relief and refracting index of the first region is equal to those of the second region.

5. The optical head apparatus as set forth in claim 1, wherein said second grid region is split into a plurality of regions.

6. The optical head apparatus as set forth in claim 1, wherein said holographic element is disposed in the light beam diffused from said light source.

7. The optical head apparatus as set forth in claim 1, wherein said second region causes an astigmatism to the reflected light beam and said photo detector detects focusing error by applying astigmatism.

* * * * *